United States Patent [19]

Swogger

[11] 3,901,128

[45] Aug. 26, 1975

[54] FLUID POWERED CONTROL SYSTEM AND FAIL-SAFE VALVING SYSTEM FOR A FLUID POWERED SYSTEM

[75] Inventor: Emery C. Swogger, Arlington, Tex.

[73] Assignee: LTV Aerospace Corporation, Dallas, Tex.

[22] Filed: Nov. 30, 1973

[21] Appl. No.: 420,488

Related U.S. Application Data

[63] Continuation-in-part of Ser. No. 391,173, Aug. 24, 1973.

[52] U.S. Cl. .................. 91/31; 91/32; 91/363 A; 91/445
[51] Int. Cl. ........................ F15b 9/03; F15b 9/09
[58] Field of Search ............. 91/445, 363 A, 33, 31

[56] References Cited
UNITED STATES PATENTS

| | | | |
|---|---|---|---|
| 1,103,037 | 7/1914 | Clark | 91/33 |
| 2,685,276 | 8/1954 | Dyken | 91/31 |
| 2,982,260 | 5/1961 | Hunter | 91/33 |
| 3,494,256 | 2/1970 | Bioletti et al. | 91/363 A |
| 3,618,470 | 11/1971 | Mueller et al. | 91/363 A |
| 3,808,947 | 5/1974 | Simmons | 91/445 |
| 3,826,174 | 7/1974 | Platt et al. | 91/363 A |

*Primary Examiner*—Paul E. Maslousky
*Attorney, Agent, or Firm*—James M. Cate; H. C. Goldwire

[57] ABSTRACT

In a fluid powered system having first and second portions, each normally receiving a supply of fluid under pressure, and a third portion, a fail-safe valving system is fluidly connected in series between the second and third portions. In one embodiment, the fluid powered system is a fluid-powered control system having a plurality of fluid amplifiers whose summed outputs provide an input signal for a flow control valve fluidly and operatively connected to an actuator which is drivingly connected to a movable structure, and the fail-safe valving system is fluidly connected in series between the flow control valve and the actuator for controlling fluid flow therebetween. The actuator is operable to translate the movable structure within a permitted range of movement. The fail-safe valving system has a valving mechanism operable for restricting but not entirely stopping fluid flow between the flow control valve and the actuator upon the occurrence of failure of each fluid amplifier, the restricted flow permitting dampened movement of the movable structure. The fail-safe valving system also has valving mechanism operable to shut off fluid flow between the flow control valve and the actuator upon the occurrence of a loss of supply pressure within the control system. In one embodiment, a position feedback linkage system is operably connected between the movable structure and a movable valving element of the flow control valve for imparting an error signal to the flow control valve, when the fail-safe valving system has been actuated to restrict fluid flow between the flow control valve and the actuator, which error signal causes the flow control valve to operate the actuator to drive the movable structure toward a preselected position within its positional range.

24 Claims, 12 Drawing Figures

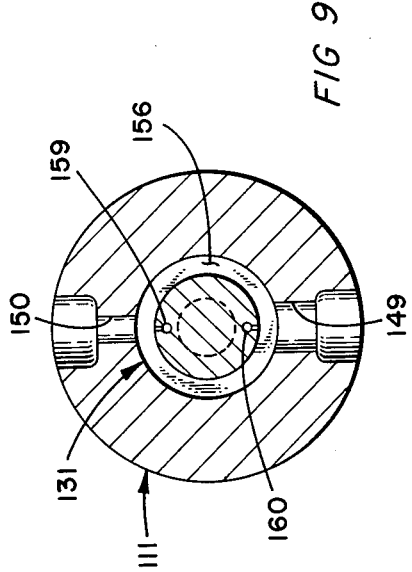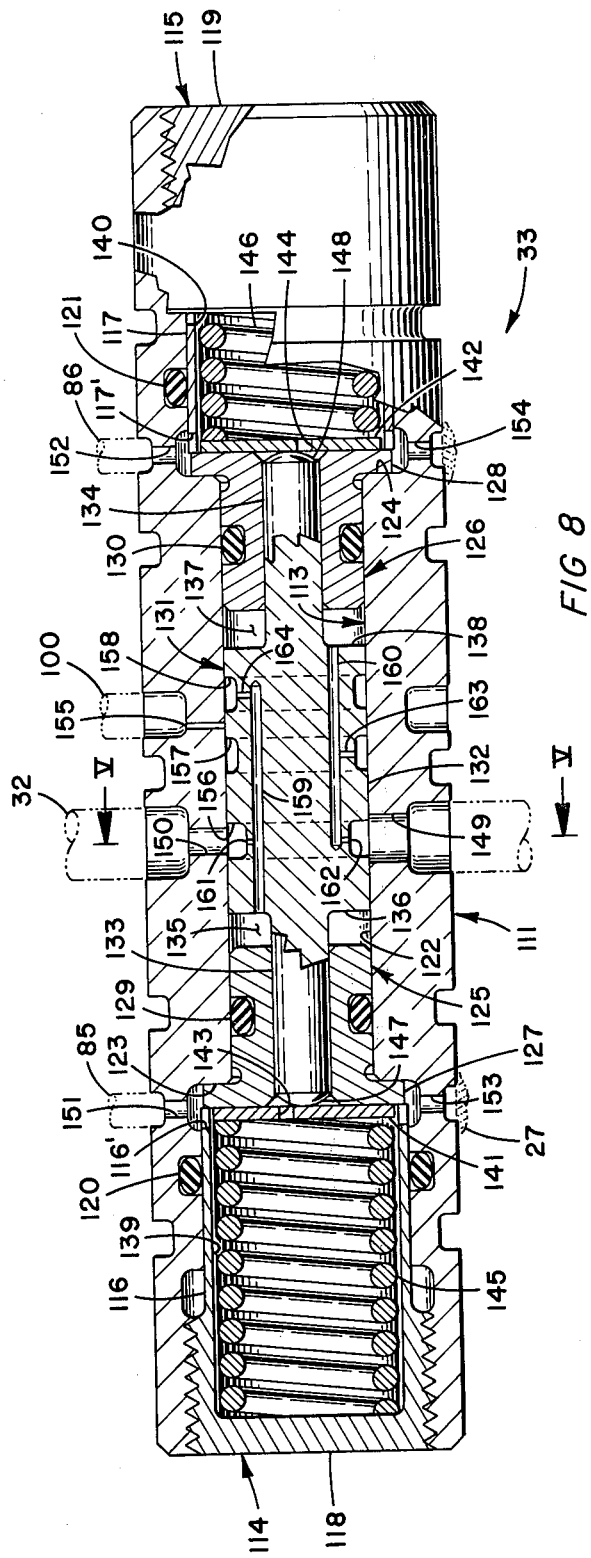

FLUID POWERED CONTROL SYSTEM AND FAIL-SAFE VALVING SYSTEM FOR A FLUID POWERED SYSTEM

This is a continuation-in-part of my copending application, Ser. No. 391,173, filed Aug. 24, 1973.

This invention relates to fluid-powered systems and, more particularly, to a fail-safe valving apparatus for such systems. More particularly, the invention relates to a fluid-powered control system drivingly connected to a movable structure and having a fail-safe valving system for damping movement of the movable structure during partial failure of the control system.

In fluid-powered servo control systems of the type described in the above-referenced application, wherein multiple fluid amplifiers provide an input signal to a flow control valve which positions a movable structure, a dangerous condition may arise if the hydraulic amplifiers should become inoperative, whereupon no position command signal is transmitted to the actuator and whereupon the position of the valving element of the fluid flow valve may become uncontrolled. For example, in such control systems employed in modern aircraft for positioning the movable, airflow control surface elements, such as vertical and horizontal stabilizers, actuator control of a rudder stabilizer may become suddenly lost following actuator failure, and air flow pressures upon the stabilizer may, if not opposed, then cause a sudden, sharp movement of the stabilizer from its previous position, thus producing a major alteration of the aircraft flight characteristics and possibly resulting in complete loss of control by the pilot. When the control system is employed in an aircraft for positioning an aircraft control surface such as a rudder, it is desirable to permit the rudder to return to its centered position, in the event of a partial malfunction of the control system, so that the pilot may retain some degree of control of the craft by the use of the remaining control surfaces. However, it is also necessary that any corrective or fail-safe movement of the control surface element be dampened to prevent undesirably sudden or severe changes in flight characteristics of the aircraft. It is also desirable that provision be made for preventing complete loss of control of the aircraft in the event of a total failure of the control system as would be caused by a loss of all fluid pressure within the control system. These hazards, and the utility of the fail-safe linkage of the present invention in minimizing them, will be more fully understood from the detailed description to follow. For clarity, and for completeness of disclosure, the multiple channel, servo control system, with its multiple, pressure-responsive monitor valves, will first be described in detail, after which the construction and operation of the fail-safe valving system and the position feedback linkage system will be described with respect to its use in combination with the servo control system.

Fluid-powered control system having multiple, redundant control channels have been proposed for various applications in which reliability is of great importance, such as avionic systems including "fly-by-wire" servo control actuator systems. It is desirable in such systems to eliminate lengthy mechanical linkages, push rods, and the like extending between a control station and a remotely controlled actuator system because such linkages have a degree of flexibility which may distort a given input signal, and because their mass may become a limiting factor when rapidly changing signals are to be transmitted. While present aircraft are designed in such a manner that they normally tend to remain relatively stable in flight, proposed aircraft, known in the art as "control configured vehicles," incorporate certain aerodynamic configurations which, while providing improvements in performance and operating efficiency, result in a decrease in inherent flight stability; they therefore require control systems having extremely rapid response times not practicably obtainable with mechanical control linkages. Thus, the use of fly-by-wire systems has been proposed wherein electromechanical "command" transducers are controlled automatically or by an operator for generating electrical command signals which are transmitted to remote, servo control systems by means of wires rather than mechanical linkages. The servo control systems employ input transducers to convert the electrical control signals into corresponding mechanical or fluidic signals, which may be amplified and then employed, for example, to effect a commanded translation of a movable element such as an aircraft control surface structure. Electrical transducers, sensors, and the like required in such servo systems, however, are susceptible to malfunctions and failure from various causes and often do not have the very high level of reliability required in the control systems of aircraft or space vehicles. To compensate for the unacceptable levels or reliability of such electrical components, as well as that of some non-electrical components, redundant control channels are employed, and various techniques of "majority voting" of multiple components have been devised wherein failed or inoperative control channels are outvoted or overpowered by the remaining channels.

Integration of the outputs of a plurality of redundant channels in a control system may be accomplished by summing the signals of each channel. Conventionally, a plurality of electrical cables from a command station transmit to a servo system a corresponding plurality of redundant, electrical command signals which, as has been suggested, may correspond to the desired position to which a movable element, e.g., an aircraft control surface element, is to be moved. As will be described more fully in the detailed description of the invention, each command signal may then be amplified within the control system, correlated with a position feedback signal corresponding to the current position of the movable element, and the appropriate corrective signal then applied to a respective one of a plurality of signal amplifiers. These amplifiers are typically of the electrohydraulic transducer type producing fluid output signals through two outlets at pressures and/or flow rates which may vary differentially with respect to each other in response to the respective electrical input signal. It is at this stage that the redundant signals are normally integrated and at which majority voting is accomplished. The hydraulic output signals of the transducers may be "summed" by employing a movable piston structure having oppositely directed piston face areas, the output portions of the multiple transducers having their respective fluid outlets interconnected with the outlets of like sense of the other transducers, the interconnected outlets of one sense having communication with a respective piston face on the movable structure and the interconnected outlets of the opposite sense having communication with a corresponding but oppositely directional piston face. The electrohydraulic transducers may be of the well-known, flapper type, in which case their nozzles are connected in parallel with each other and with the two piston face areas of the summing structure effectively averaging the differential pressures and flows across the fluid outlets of the transducers. Or, other types of fluid amplifiers may be employed in parallel. In all such cases wherein there is fluid communication between the outlets of the fluid amplifiers, however, there exists the disadvantage that should a leak, or a flow stoppage or restriction, occur in any of the conduits or passageways through which fluid pressure is communicated from the amplifiers to the movable summing structure, the output of the entire system is directly affected and the system may malfunction or become inoperative. Such problems are minimized by a second summing method, which will be termed herein the "force summing method," and in which each of the amplifier fluid outlets of a given sense has communication with a respective one of a plurality of piston face areas formed on the movable summing structure and facing in a first direction, and each of the fluid outlets of the opposite sense has communication with one of a second plurality of piston face areas facing in a second, opposite direction. Fluid amplifiers of the type known as jet pipe, electrohydraulic valves may be employed in such systems and incorporate a fluid supply of constant flow rate which is ejected through a jet nozzle movably mounted in a manner which permits the ejected flow to be directed into either of two outlets or to be proportionally divided therebetween. In any of the systems, a feedback system, such as a mechanical spring element, is preferably connected between each respective fluid amplifier movable element and the summing structure. The feedback elements, as will be more fully described hereinbelow, serve to minimize the output of any amplifier which is in substantial disagreement with the signals of the remaining channels by averaging the signals of all the channels.

Voting may be accomplished by averaging the output signals of the amplifiers, those channels which are out of agreement with the remaining channels being substantially overpowered thereby. In such systems, however, there remains an erroneous bias upon the amplifiers of the remaining channels (presumably the correctly operating channels), which results in an averaged output signal at least somewhat deviated from the commanded signal. Moreover, if a subsequent failure of one or more of the other amplifiers occurs of a nature causing a deviation in output of the same sense as that of the first failure, the erroneous signals are then accumulated, and the system output is distorted by both erroneous signals.

Because of this limitation with respect to system response after multiple failures, it may be necessary, in systems in which a high degree of reliability is required, to incorporate monitoring and valving mechanisms operable to sense an abnormal condition in any of the channels and to deactivate or isolate an abnormal channel from the remaining channels. Some relatively complex systems employ sensing and valving devices operative to compare the output of each of a plurality of redundant components, such as transducers or amplifiers, with that of the remaining such components. It can thus be seen that in a system employing a given number $n$ of channels, a minimum number of comparators given by the series $[(n-1) + (n-2) \ldots (n-n)]$ are needed for such an approach. Moreover, if it is desired to completely isolate the fluid output signal of the failed channel from the remaining channels interconnected therewith, an undesirably large number of valves, corresponding to the number of passageways interconnected between the several amplifiers, must be provided, or the fluid supplied to each amplifier must pass through $n-1$ shut off valves prior to entering that amplifier. A further problem with some such systems is that inoperative fluid amplifiers may impart an undesirably great load or drag opposing any movement of the movable member. This occurs because the fluid pressure control segment of some such amplifiers incorporate restrictive orifices or nozzles through which fluid must pass when the movable summing structure is moved. Furthermore, in those redundant channel control systems employing multiple electrohydraulic transducers whose outputs are interconnected with those of other transducers, monitoring of the fluid pressures at the output stages of the individual transducers is made difficult or impossible because a change in pressure at one transducer tends to distort the fluid output of the other transducers.

It is, therefore, a major object of the present invention to provide a new and improved fluid-powered control system of the type having a plurality of redundant fluid amplifiers.

Another object is to provide such a control system in which fluid outlet pressures of the respective fluid amplifiers are mechanically summed by means of a movable summing structure and wherein no fluid communication is permitted between fluid outlets of respective fluid amplifiers.

A further object is to provide such a control system wherein differential pressure signals produced by the respective fluid amplifiers are discretely monitored, and wherein the fluid supply to any of the fluid amplifiers is shut off upon the occurrence of a differential pressure across its outlets which exceeds a predetermined value, whereby the system is adapted for use in combination with a fail-safe valving system responsive to a loss of fluid supply to all of the fluid amplifiers.

Yet another object is to provide such a control system having a movable summing structure which is operatively connected to the valve element of a power amplifying, hydraulic flow control valve.

Another object is to provide such a control system in which the flow control valve is fluidly connected to drive an actuator and is operable to control the velocity of movement of a load driven by the actuator.

Another major object is to provide such a control system having a fail-safe linkage system operative to permit dampened movement of the load upon the fluid supply to each fluid amplifier being shut off, and to prevent further substantial movement of the load upon the loss of all supply pressure within the control system.

A further object is to provide such a system also having a feedback linkage system operatively connected between the load and the valve element of the flow control valve for imparting an error signal to the flow control valve, when the valving system has been actuated to restrict fluid flow between the flow control valve and the actuator, which error signal causes the flow control valve to operate the actuator to drive the load toward a preselected position within its positional range.

Other objects and advantages will be apparent from the specification and claims and from the accompanying drawing illustrative of the invention.

In the drawing:

FIGS. 1–4 provide a diagrammatic representation of a redundant channel control system and fail-safe valving system constructed according to a preferred embodiment of the present invention, FIG. 3 showing a preferred embodiment of the fail-safe valving system;

FIG. 8 is a longitudinal, sectional view of one of the monitor valves of FIG. 2 in an enlarged scale;

FIG. 9 is a cross-sectional view taken as on line IX — IX of FIG. 8;

Figure 1:
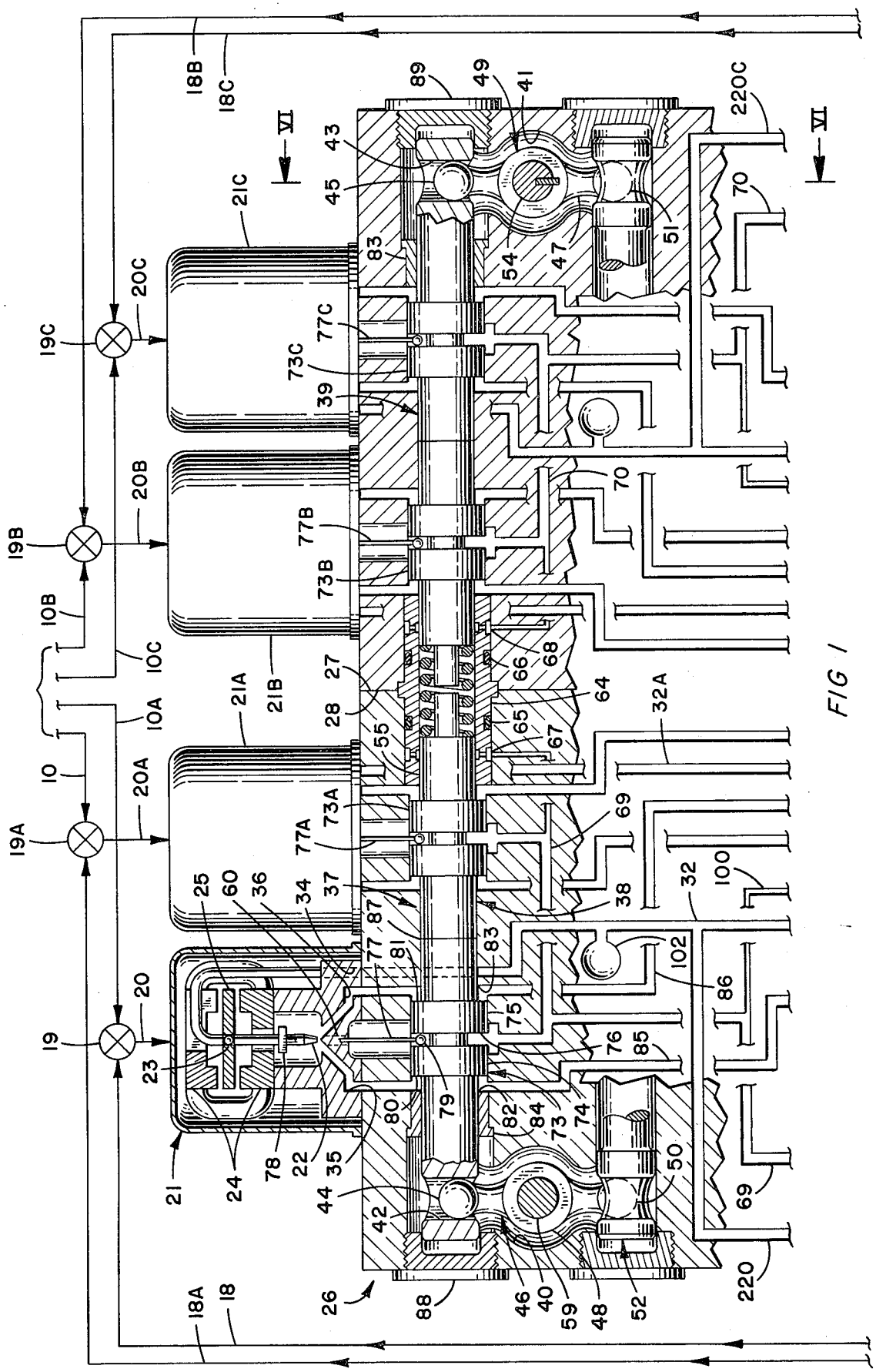

With initial reference to FIG. 1, the control system, identified herein with reference to the system housing 26 to be described, is electrically connected to a remote command station, not shown, via multiple input cables 10, 10A, 10B, and 10C. For illustrative purposes, the control system (26) will be described with respect to its application in an aircraft control system of the "fly-by-wire" type wherein the command station to which redundant input cables 10, 10A, 10B, and 10C extend includes an electromechanical transducer continuously positioned or controlled by the pilot or by an automated, flight control system. The control system (26) of the present invention is employed as a servo system having a duplex hydraulic actuator 11 (FIG. 3), having dual pistons 12 and 13 connected by a piston rod 14 for positioning a load, such as an airfoil 241 (FIG. 7, to be described) or other movable element. In such an application, the actuator piston rod 14 is drivingly connected to the airfoil 241 suitably by means of a linkage 240 (FIG. 7), as will be described hereinafter, attached to a fastening lug 15 mounted on the projecting, distal end of the piston rod 14.

An electromechanical, position sensor system 16 is mounted on the actuator 11 and has axially movable connecting rods 17 extending from the sensor in parallel alignment with the actuator piston rod 14, the distal ends of the connecting rods 17 suitably being fastened to the connecting lug 15 of the piston rod 14 whereby the connecting rods 17 are axially movable in unison with the piston rod 14. The construction and operation of such electromechanical position sensors is well known, and they essentially comprise electromagnetic transducers operable to produce an electrical signal proportional to the position of a movable element. In the present embodiment, four such signals are required, and a sensor system of the linear variable differential transformer type having four sensor elements similar to that available from the G. L. Collins Corp. under part no. LMT199V15 is suitable. Such a sensor system 16 includes four transducer elements, not shown, for producing redundant position signals, first, second, third and fourth position feedback wires 18, 18A, 18B, and 18C being respectively connected to the transducer elements. First, second, third, and fourth difference signal amplifiers 19, 19A, 19B, and 19C, of a generally known type, are connected to the first, second, third, and fourth position feedback wires 18, 18A, 18B, and 18C, respectively, and to the first, second, third, and fourth input cables 10, 10A, 10B, and 10C, respectively. According to principles known to those in the art, the difference signal amplifiers are each operable to compare the command signal received through the respective, associated input cable 10, 10A, 10B, or 10C with the position signal received through the corresponding feedback wire 18, 18A, 18B, or 18C, respectively. Each difference signal amplifier 19, 19A, 19B, and 19C is operable to produce an electrical "error signal" which is proportional to the difference between the commanded, position signal received through the respective, associated input cable 10, 10A, 10B, or 10C and the position signal received through the corresponding, respective, feedback wire 18, 18A, 18B, or 18C, according to methods generally known in the art of servo control mechanisms. The difference signal amplifiers 19, 19A, 19B, and 19C amplify the difference signals somewhat, and additional amplifying circuits (not shown) may also be provided in series therewith.

The redundant command signals received through the input cables 10, 10A, 10B, and 10C, integrated with the feedback signals received through feedback wires 18, 18A, 18B, and 18C, respectively, are then fed through output leads 20, 20A, 20B, and 20C.

First, second, third, and fourth fluid amplifiers 21, 21A, 21B, and 21C, suitably of the type manufactured by the Abex Corp. under part no. VQ72-0297-1, have their input terminals connected to output leads 20, 20A, 20B, and 20C, respectively. The fluid amplifiers 21, 21A, 21B, and 21C, in the present embodiment, each comprises an electrohydraulic transducer and signal amplifier of the type known in the art as a "jet pipe valve." In the description to follow, only the first fluid amplifier 21 and its associated elements throughout the system 26 will be described, it being understood that the other control channels are substantially identical. The construction of such a fluid amplifier 21 is known in the art, and it is thus illustrated diagrammatically and described herein only summarily. Internally, the amplifier 21 includes a fluid nozzle or jet pipe 22 which is pivotally mounted upon an axle 23 (extending perpendicularly of the sheet of the drawing). A fixed electromagnetic assembly 24 is electrically connected between a ground and the output wire 20 and is arranged to react magnetically with a movable magnet structure 25 affixed to the jet pipe 22 for causing pivotal movement of the jet pipe upon axle 23 in response to any electrical "command" signal received from difference signal amplifier 19.

A system housing 26 is provided and is preferably divided into first and second, contiguous housing segments 27, 28 suitably having a planar interface. As will become apparent, the division of the housing 26 into two segments 27, 28 is a means for preventing total failure of the system should the housing 26 be damaged in such a manner that a crack develops and tends to progress through the housing. Such a crack or rip will be stopped at the interface of the housing segments 27, 28. The fluid amplifiers 21, 21A, 21B, and 21C are mounted upon a flat, external surface of the housing 26, the first and second amplifiers 21, 21A being seated upon the first housing segment 27 and the third and fourth amplifiers 21B, 21C being similarly mounted upon the second housing segment 28, the amplifiers being mutually spaced in side-by-side alignment along an axis extending perpendicularly of the interface of housing segments 27, 28.

A source, not shown, of fluid under pressure, suitably hydraulic fluid, is provided and, in the present embodiment, first and second fluid supply inlets 29, 30, represented diagrammatically as pressure sources $P_1$ and $P_2$, respectively, are provided in the first and second housing segments 27, 28, respectively, in communication with the fluid source. The first fluid source 29 has communication with first and second, electromagnetically controllable shutoff valves 31, 31A (FIG. 2), suitably of the type manufactured by the Sterer Engineering & Manufacturing Co. under part no. 50030. The shutoff valves 31, 31A are normally open to permit fluid flow therethrough, but may be activated to shut off fluid flow by an electrical signal. In the present embodiment, a remote control switch and power source, not shown, are installed in the aircraft cockpit for providing remote control of the shutoff valves 31, 31A. First and second fluid supply passageways or conduits 32 and 32A communicate with the fluid source 29 through the first and second shutoff valves 31, 31A, respectively, and also extend through the first housing segment 27, through first and second, normally open monitor valves 33, 33A, respectively, (to be described) to the first and second fluid amplifiers 21, 21A, respectively. Similarly, third and fourth fluid supply conduits 32B and 32C communicate with the second fluid source 30 through the third and fourth shutoff valves 31B, 31C, respectively, and extend through the second housing segment 28, through the third and fourth monitor valves 33B, 33C, respectively, to the third and fourth fluid amplifiers 21B, 21C, respectively. Fluid sources $P_1$ and $P_2$ are effective to supply a continuous fluid flow to the fluid amplifiers 21, 21A, 21B, 21C unless the supply conduits 32, 32A, 32B, 32C are closed by the shutoff valves 31, 31A, 31B, 31C, respectively, or by the monitor valves 33, 33A, 33B, 33C, respectively. While fluid sources $P_1$ and $P_2$ will be discussed herein as sources of hydraulic fluid, it should be understood that the system 26 may employ gasses, as well as other liquids, in a similar manner.

With respect again to the first fluid amplifier 21 as typical of the amplifiers 21A, 21B, and 21C, a fluid inlet 34 of the amplifier 21 has communication with the first supply conduit 32 and with the jet nozzle 22 of the fluid amplifier 21. First and second, mutually divergent, fluid outlets 35, 36 are arranged to receive fluid ejected through the jet nozzle 22, the nozzle structure 22 being pivotally mounted to permit ejection of fluid predominately through either outlet or in a desired proportion through both outlets 35, 36 to cause a differential pressure signal across the outlets and/or a differential fluid flow into the outlets corresponding to the respective electrical command signal received by the amplifier 21 through lead 20.

Figure 3:
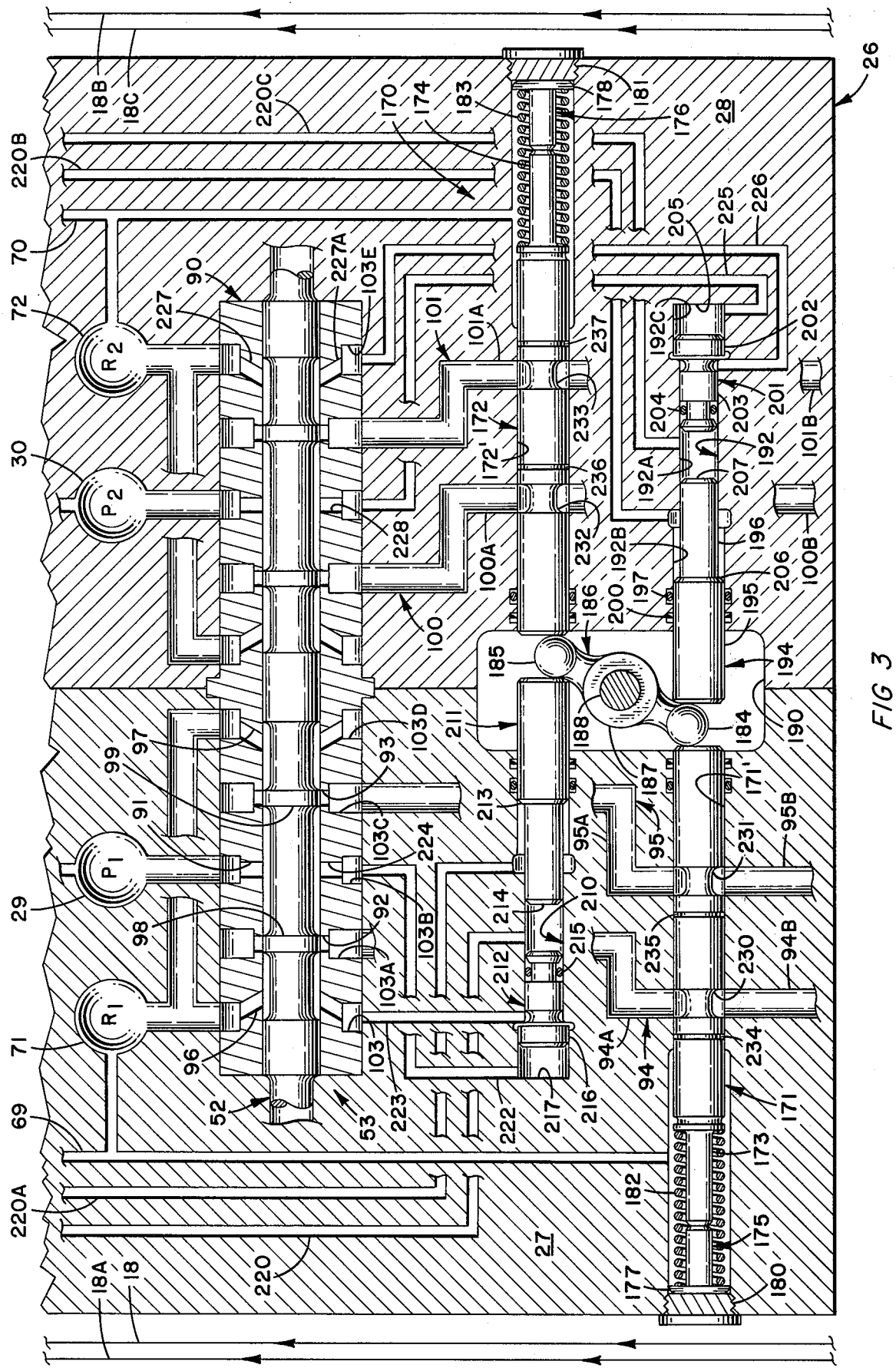

A movable structure 37, comprising first and second, mutually spaced, elongated structures 38, 39 arranged in longitudinal alignment and in tandem, is slidably mounted within corresponding chamber portions formed within the housing 26 along an axis extending parallel to the axis upon which the amplifiers 21, 21A, 21B, 21C are aligned. The outermost ends of the movable structure 37 extend within respective cavities 40, 41 formed within the first and second housing segments 27, 28, respectively, and have respective bearing sockets 42, 43 formed therein for rotatably and transversely slideably receiving respective spherical end portions 44, 45 of first and second rocker arms 46, 47. The rocker arms 46, 47 are pivotally mounted within the housing 26 upon respective bearing structures 48, 49 seated within portions of the housing segments 27, 28, respectively, and arranged to permit rotational movement of the rocker arms 46, 47 about respective axes extending centrally through the respective rocker arms 46, 47, and perpendicularly of the longitudinal axis of the movable structure 37. The opposite ends of the rocker arms 46, 47 similarly define third and fourth, spherical end portions 50, 51, respectively. The third and fourth spherical end portions 50, 51 are rotatably and slideably seated in corresponding sockets or cavities, similar to the sockets 42, 43, formed in respective, adjacent end portions of an axially movable, elongated valve element 52 (the mid-portion of which is shown in FIG. 3) which comprises the slideable spool element of a flow control valve 53 (FIG. 3), to be described below. With additional reference to FIG. 6, the second rocker arm 47 and its associated bearing structure 49 are shown in section, in a view taken in the first direction. The rocker arm 47 is supported by an axle 54 which extends through a corresponding bore formed through the rocker arm along its pivotal axis, the rocker arc being restrained from rotation about the axle 54 by a woodruff key 55 seated within suitable slots extending axially and radially within the axle 54 and rocker arm 47. Bearing structure 49 suitably comprises first and second ball bearing assemblies 49A and 49B mounted on opposite sides of the rocker arm and within which the axle 54 is rotatably journalled, the non-rotatable portion of first bearing assembly 49A being seated within a suitable cavity formed within the second housing segment 28 and the non-rotatable portion of second bearing assembly 49B being correspondingly seated within a cavity formed within a cover plate 56 removably fastened to the housing segment 28 by bolts 57 for facilitating access to the bearing structure 49 and associated parts. The axle 54 extends through and from the housing segment 28 for supporting portions of a failsafe linkage system 58 (to be described in the last portion of the specification). The bearing structure 48 supporting the first rocker arm 48 (FIG. 1) is identical to the second bearing structure 49 just described, but is associated with an axle 59 which does not extend through the first housing segment 27, since no linkage system corresponding to the linkage system 58 is connected to the first rocker arm 46 or its axle 59.

Figure 2:
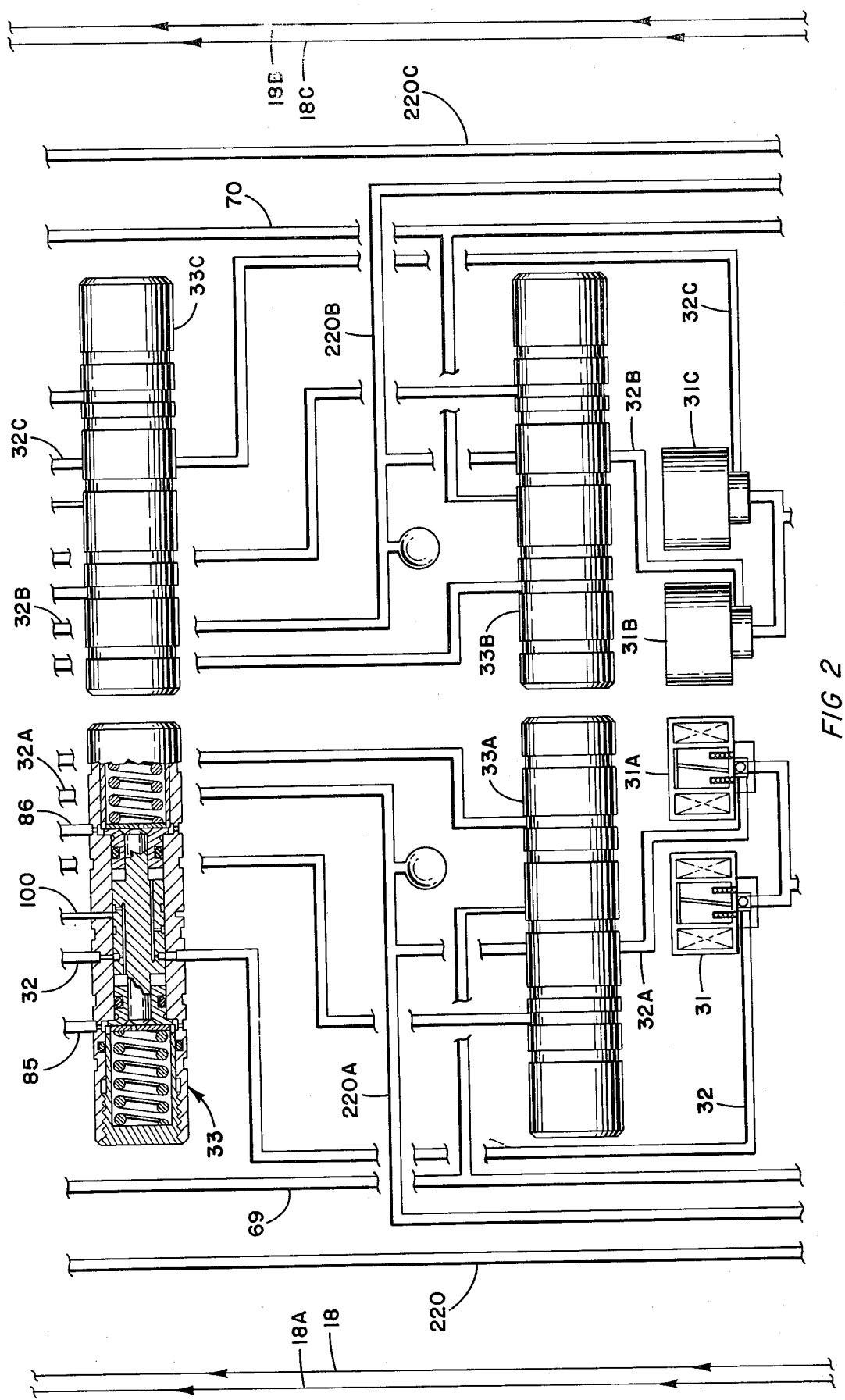

For clarity of illustration, the control system 26 has been diagrammatically illustrated, in FIGS. 1-3, as extending predominately in the plane of the drawing, or in only two dimensions. In its preferred form of construction, however, those portions of the fluid system 26 shown as extending between the movable summing structure 37 (FIG. 1) and the flow control valve 53 (FIG. 3) may be positioned in a plane beneath or above the plane of the drawing, e.g., behind the summing structure 37 and the flow control valve 53.

The movable summing structure 37 is formed of the two, elongated segments or structures 38, 39, consistent with the construction of the housing 26 in two segments 27, 28, in order to permit, as a safety measure, complete fluid isolation of all components in one housing segment 27 from those in the other segment 28. The two elongated structures 38, 39 have their confronting ends footed against a compressed, coil spring 61 which urges the elongated structures 38, 39 apart, thus keeping the elements firmly seated against the rocker arms 46, 47; in turn keeping the rocker arms firmly seated against the valve element 52; and thus causing the two elongated structures 38, 39, to remain equally spaced unless the spring 61 is further compressed by excessive differential pressures on the piston faces of piston structures 73, 73A, 73B, and 73C, to be described. To prevent any leakage of fluid at the interface of the housing segments 27, 28 adjacent the two elongated structures 38, 39, and for convenience of construction, the mutually adjacent end portions of the elongated structures 38, 39 each are formed with respective stepped, mutually coaxial, first and second, cylindrical portions 62, 63 of reduced diameter, the second portions 63 being of relatively smaller diameter than the first portions, extending from the respective first portions 62 centrally within the coil spring 61 but having end portions spaced to permit a small degree of relative longitudinal movement of the elongated structures 38, 39.

The stepped, first cylindrical end portions 62 of the first and second elongated structures 38, 39 extend slideably within opposite ends of a generally cylindrical, tubular sleeve member 64 which extends equidistantly within corresponding, mutually contiguous, cylindrical cavities extending within the respective housing segments 27, 28, the sleeve member 64 being sealingly associated with the housing segments by first and second, O-ring seals 65, 66 seated circumferentially around the sleeve adjacent the first and second housing segments 27, 28, respectively. The coil spring 61 thus extends coaxially within the sleeve 64. First and second drainage ducts 67, 68 are formed through the sleeve member 64 at locations thereon spaced longitudinally outwardly of the first and second seals 65, 66 and have communication with respective, first and second, fluid return passageways 69, 70 which communicate with respective fluid return or drainage outlets 71, 72 (FIG. 3) in the first and second housing segments 27, 28, respectively.

The movable summing structure 37 is provided with first, second, third, and fourth, mutually spaced piston structures 73, 73A, 73B, and 73C which are respective positioned adjacent the first, second, third, and fourth fluid amplifiers 21, 21A, 21B, and 21C. With respect to the first piston structure 73, as typical, the piston structure 73 includes first and second pistons 74, 75, suitably formed as cylindrical, mutually spaced, radially projecting portions of the first elongated structure 38. An annular groove 76 is defined between the first and second pistons 74, 75 and, upon the movable structure 37 being positioned, as shown in FIG. 1, in a centered position within its permitted range of longitudinal movement, the groove 76, and respective, corresponding grooves of the second, third, and fourth piston structures 73A, 73B, 73C, are aligned with the respective pivot axles 23 of the first, second, third, and fourth fluid amplifiers 21, 21A, 21B, 21C, respectively. More precisely, each groove 76 is bisected by a plane perpendicular to the longitudinal axis of the movable structure 37 and coincident with the axle 23 of the respective, adjacent amplifier 21 and with the fluid nozzle 22 of the respective amplifier when the nozzle is in a centered position and extends perpendicularly of the axis of movable structure 37. First, second, third, and fourth position feedback elements 77, 77A, 77B, 77C are fastened to the jet nozzle pipes 22 of the first, second, third, and fourth fluid amplifiers 21, 21A, 21B, 21C, respectively, for movement with the respective nozzles. Each feedback element 77 is suitably mounted upon a sheet 78 of a light, non-ferrous material such as aluminum, which is fastened to the jet nozzle 22 of the respective amplifier 21, positioned in a plane perpendicular to the pivotal axis of the axle 23 of the respective amplifier 21, and movably positioned whereby upon the nozzle 22 pivoting on its axle 23, the aluminum sheet 78 is free to move laterally without contacting or interfering with other structure within the amplifier 21 or with the first and second outlets 35, 36. A drain passageway 60, shown diagrammatically, extends between the interior of the amplifier 21 and the piston structure 73 for providing a drainage outlet for the fluid flow through jet pipe nozzle 22.

The feedback elements 77, 77A, 77B, 77C are suitably elongated leaf spring elements, extending toward the adjacent annular grooves 76 of the respective, adjacent piston structures 73, 73A, 73B, 73C when both the jet nozzles 22 and the elongated structure 37 are positioned centrally within their respective ranges of movement as shown in the drawing and as described more fully hereinbelow, and each feedback element is provided on is distal end with a respective, spherical bearing member 79 which is arranged to seat within the annular groove 76 of the respective, adjacent piston structure 73, 73A, 73B, and 73C and to have sliding contact therein with the pistons 74, 75. Communication is provided, through suitable passageways within the first housing segment 27, between the annular grooves 76 of the first elongated member 38 and the first fluid return passageway 69 and, within the second housing segment 28, between the corresponding annular grooves of the second elongated structure 39 and the second return passageway 70.

With respect to the first piston structure 73 as typical, the outboard side surfaces of the first and second pistons 74, 75 define respective, first and second piston faces 80, 81 facing in first and second, opposite directions along the axis of the movable structure 37, or leftwardly and rightwardly as viewed in the drawing. All of the piston face areas 80, 81 of the piston structures 73, 73A, 73B, and 73C are of equal area. Each piston structure 73, 73A, 73B, 73C is slideably and sealingly seated within a respective, corresponding, cylindrical cavity formed within the housing 26, the cylindrical cavities each being divided into first and second chamber portions 82, 83 by the respective, associated piston structures 73, 73A, 73B, 73C, the first and second piston face areas 80, 81 of each piston structure facing and partially defining the first and second chamber portions 82, 83 respectively disposed adjacent the corresponding piston structures 73, 73A, 73B, 73C. With respect again to the first amplifier 21 and piston structure 73 as typical, the first and second chamber portions 83, 84 have communication through the housing 26 with the first and second fluid outlets 35, 36, respectively, of the first amplifier 21 and, through first and second pressure monitoring passageways 85, 86, respectively, with the first monitoring valve 35, to be described hereinbelow.

The portions of the movable structure 37 extending between the first and second piston structures 73, 73A and between the third and fourth piston structures 73B, 73C which lie beyond the respective, adjacent chamber portions 82, 83 are sealingly and slideably related to adjacent portions of the first and second housing segments 27, 28, respectively. As has been previously stated, the first cylindrical portions 62 of the mutually confronting, stepped end portions of the first and second elongated structures 38, 39 are sealingly and slideably fitted within the sleeve member 64. Similarly, tubular bushings 84 are sealingly fitted within corresponding cavities formed within the housing 26 adjacent and outwardly spaced from the first and fourth piston structures 73, 73C for facilitating assembly of the system 26, as will be more fully explained below. A portion of the first elongated structure 38 extending, in the first direction, beyond the first chamber portion 82 adjacent the first piston structure 73 extends sealingly and slideably within one of the tubular gaskets 84; similarly, a portion of the second elongated structure 39 extending, in the second direction, beyond the second chamber portion 83 adjacent the fourth piston structure 73C extends sealingly and slideably within another of the tubular gaskets 84. Thus, the tubular gaskets 84, the sleeve member 64, and portions of the housing 26 extending between the first and second and the third and fourth piston structures 73, 73A and 73B, 73C serve to fluidly isolate the chamber portions 82, 83 adjacent each piston structure 73, 73A, 73B, 73C from those adjacent the other piston structures. Correspondingly, the fluid outlets 35, 36 of each of the fluid amplifiers 21, 21A, 21B, 21C are isolated from those of the other fluid amplifiers, a factor which affords several important advantages over prior art control systems in which several fluid amplifier units have fluid communication with each other, as will become apparent from the description to follow.

The first and second chamber portions 82, 83 adjacent each piston structure 73, 73A, 73B, and 73C are of sufficient width and are appropriately spaced to permit a desired degree of axial movement of the piston structures, and thus of the movable structure 37, as determined by the flow characteristics of the flow control valve 53 and the desired maximum actuator velocity.

For convenience of assembly, each of the elongated structures 38, 39 is suitably divided, at respective locations thereon spaced between the piston assemblies 73, 73A and between the piston assemblies 73B, 73C and as indicated at 87, into two, mutually abutting segments which are continuously maintained in firm contact by the spring 61 with a force which, as has been suggested, also maintains both elongated segments 38, 39 firmly seated against the respective rocker arms 46, 47. First and second removable, externally threaded cup members 88, 89 are sealingly and threadingly engaged within corresponding, internally threaded cavities formed within the housing segments 27, 28, respectively, coaxially of the elongated members 38, 39, respectively. The cup members 88, 89, when threadingly inserted, coaxially and slideably enclose the outer end portions of the first and second elongated members 38, 39, respectively, and serve to facilitate the assembly and maintenance of the movable structure 37.

With additional reference now to FIG. 3, the flow control valve 53, the valve element 52 of which is operatively connected to the movable structure 37 (FIG. 1) by means of the first and second rocker arms 46, 47, is of the known type wherein a movable valve element (52) controls the division of fluid flow from the valve into two outlets. The flow control valve 53 employs a substantially tubular housing 90 which is sealingly mounted within a corresponding cavity within the housing 26. More precisely, the valve housing 90 extends equidistantly within the first and second housing segments 27 and 28 along an axis which is parallel to the longitudinal axis of the summing structure 37 (FIG. 1). With respect to the portion of the flow control valve 53 extending within the first housing segment 27, which portion constitutes a single, flow control valve redundant to and substantially identical to the valve portion extending within the second housing segment 28, there is provided through the valve housing 90 a fluid inlet 91 having communication with the first source of fluid under pressure $P_1$ and first and second fluid outlets 92, 93 which communicate, through conduits 94, 95, respectively, with the interior of the portion of the actuator 11 containing the first piston 12 at respective locations spaced on opposite sides of the first actuator piston 12, conduits 94 and 95 communicating through portions of the valving system (170), to be described. The first and second valve outlets 92, 93 are spaced in the first and second directions, respectively, along the length of the valve housing 90 (leftwardly and rightwardly, as viewed in the drawing) from the fluid inlet 91. First and second fluid return passages or orifices 96, 97 are also formed through the valve housing 90, the return passages 96, 97 both having communication with the first fluid return outlet $R_1$. The first return orifice 96 is spaced, in the first direction, beyond the first fluid outlet 92, and the second return orifice 97 is spaced, in the second direction, beyond the second fluid outlet 93.

The valve element 52 is sealingly and slidingly associated along its length with the valve housing 90 but is reduced in diameter along portions of its length which may become adjacent the fluid inlet 91, the outlets 92, 93, and the return orifices 96, 97, during any permitted position of the valve element 52. First and second, mutually spaced, annular lands 98, 99 extend circumferentially around the valve element 52, the first land 98 being positioned between the first return orifice 96 and the inlet 91, and the second land 99 being positioned between the inlet 91 and the second return orifice 97. Upon the movable summing structure 37 (FIG. 1) being positioned in its central position as shown in FIG. 1, the first and second lands 98 and 99 of the valve element 52 are in register with the first and second fluid outlets 92 and 93, respectively, the width of the lands 98, 99 being substantially the same as the diameter of the outlets 92, 93, respectively. For convenience of assembly, first, second, third fourth, and fifth external annuli 103, 103A, 103B, 103C, and 103D are formed circumferentially of the valve housing 90, respectively adjacent and in communication with the first return orifice 96, the first fluid outlet 92, the fluid inlet 91, the second fluid outlet 93, and the second return orifice 97. Thus, the external annuli 103, 103A, 103B, 103C, and 103D permit communication between the conduits 96, 92, 91, 93 and 97 and the respective associated passageways, e.g., 71, 94, 29, 95, without precise orientation of the valve housing 90, upon its longitudinal axis, within the housing 26. The portion of the valve 53 extending within the second housing segment 28 is similarly constructed, and has corresponding outlet conduits 100, 101 communicating, through portions of the valving system 170, with the interior of the actuator 11 on opposite sides of the second piston 13.

From the above description it will be recognized by those in the art that the flow control valve 53 is of a type operable, in response to axial movement of the valve element 52, to control the rate and direction of flow of fluid under pressure through conduits 94 and 95, and through conduits 100, 101, to the actuator 11, thereby controlling the direction and velocity of movement of the duplex piston 14.

Figure 7:
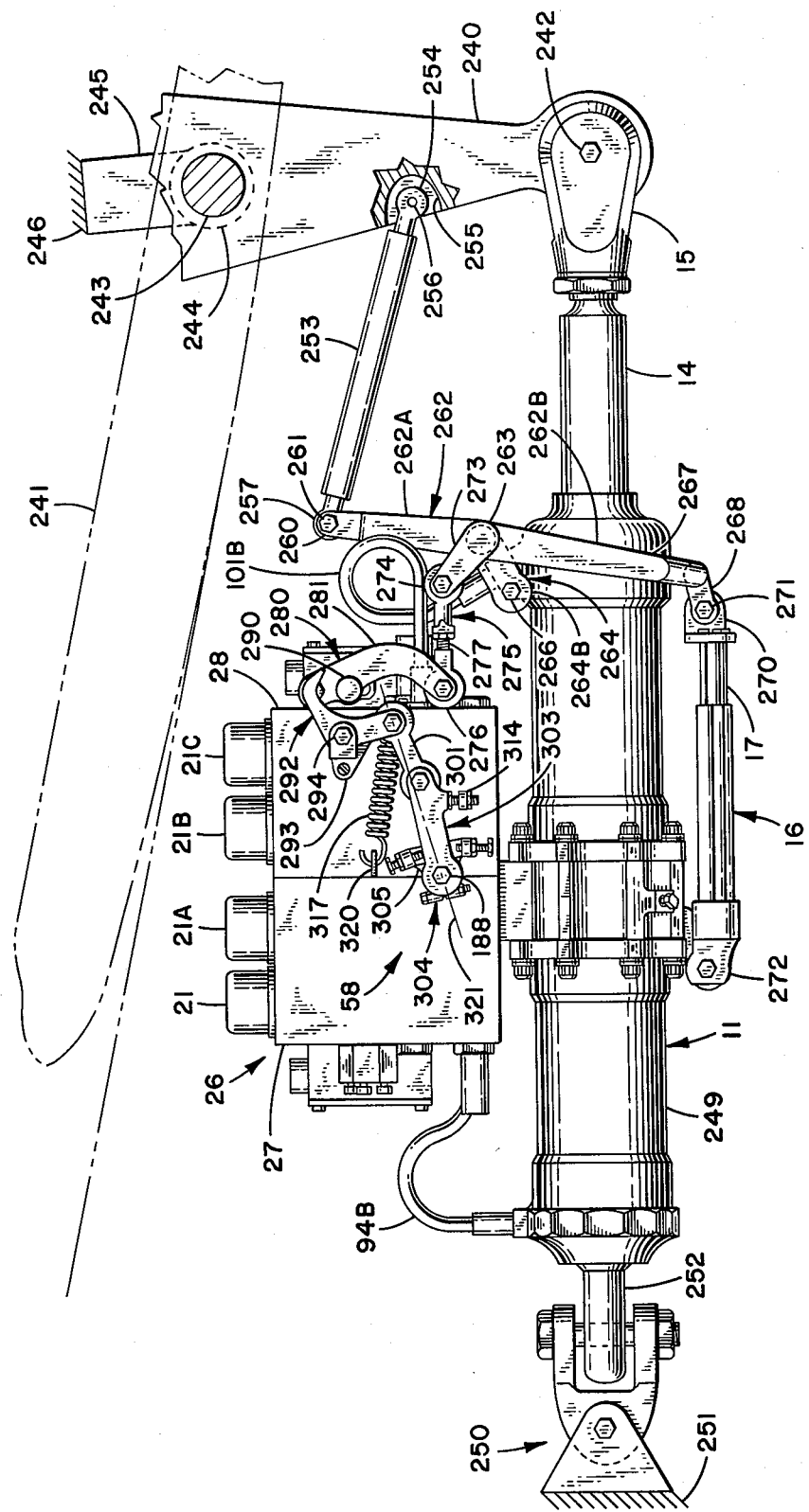
FIG. 7 is a plan view, partially diagrammatic, of the system of FIGS. 1–6 and of associated components of the fail-safe position feedback linkage system, the linkage system being shown in its cam-engaged mode.
Figure 10:
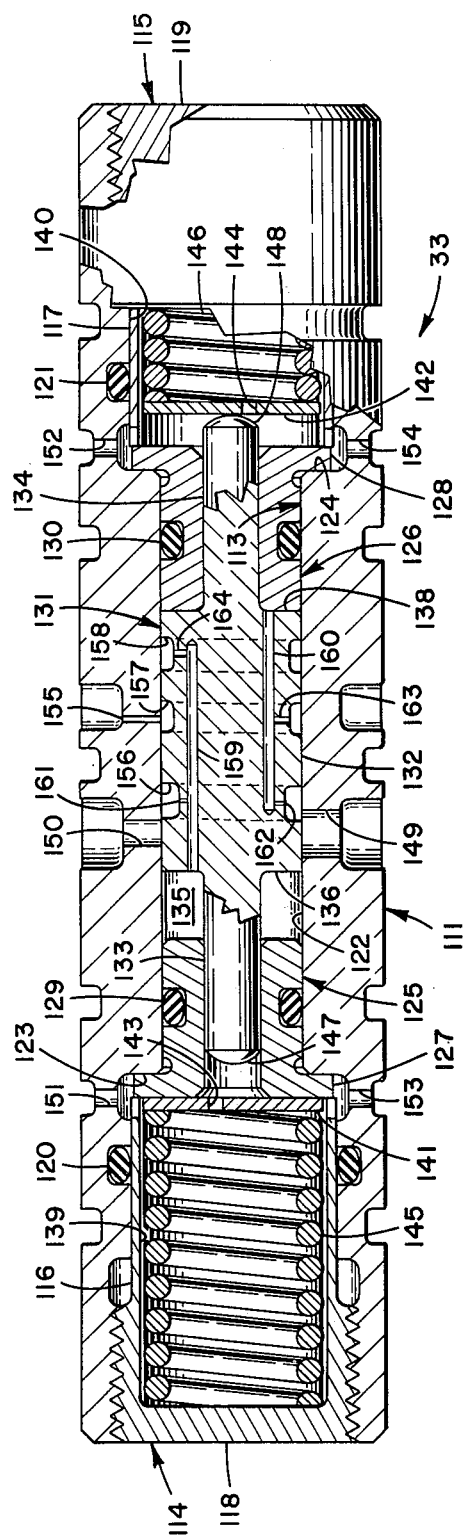
FIG. 10 is a view similar to FIG. 8 showing the valve element of the monitor valve in an alternative position.

With respect now to the operation of the portions of the control system 26 thus far described, as has been previously suggested, the operation of servo system components such as the fluid amplifiers 19, 19A, 19B, 19C and the corresponding transducers of the position sensor system 16 (FIG. 3) in response to electrical command signals received from a remote control station is generally known in the art. Summarily, and with respect to the first channel, an electrical signal of a current level which may vary over a predetermined range is supplied to the difference signal amplifier 19 through cable 10. The signal supplied at any given moment corresponds to a position, within a corresponding range of physical movement, at which it is desired to position the actuator piston 14 and its load, which in the case of the present embodiment and as has been previously stated, may be a movable airfoil or control surface element 241 (FIG. 7). An electrical signal corresponding to the current position of the piston 14 is produced by an element of the position sensor 16, suitably by an inductive modification of an externally supplied signal, as occurs in the present, commercially supplied LVDT sensor 16 previously named, and conducted by feedback wire 18 to the difference signal amplifier 19. The difference signal amplifier 19 compares the feedback signal received from the sensor system 16 with the command signal received via input cable 10 and, if the piston rod 14 is not in the commanded position, difference signal amplifier 19 produces an error signal, or modified command signal, which it electrically amplifies and which is then conducted via output lead 20 to the first fluid amplifier 21. The fluid amplifier 21 is operative, as was previously discussed, to translate the modified command signal received through lead 20 into a corresponding differential pressure signal across its outlets 35, 36 (absent any movement of the summing structure 37) and thus, across the first and second piston face areas 80, 81 of the first piston structure 73. While the operation of only the servo components associated with the first fluid amplifier 21 have been described, it will be understood that the corresponding components associated with the second, third, and fourth fluid amplifiers 21A, 21B, and 21C function similarly to provide redundant, modified command signals, to the second, third, and fourth amplifiers.

It will be recalled from the initial discussion of prior-art control systems that it is the electrical components of such systems which are the most susceptible to failures or malfunctions and for which the greatest degree of redundancy must therefore be provided. Thus, a redundancy level of four is incorporated into the system 26 with respect to the fluid amplifiers 21, 21A, 21B, 21C, the difference signal amplifiers 19, 19A, 19B, 19C, and the four-element position sensor system 16, whereas only two operating sections are required for the duplex actuator 11 and for the flow control valve 53, respectively. Assuming that each element of the position sensor system 16, and each of the difference signal amplifiers 19, 19A, 19B, 19C and the fluid amplifiers 21, 21A, 21B, and 21C are functioning properly and that identical, redundant command signals are received by difference signal amplifiers 19, 19A, 19B, and 19C, then the differential fluid pressures produced by each fluid amplifier 21, 21A, 21B, 21C are substantially identical, and each imparts a force upon the summing structure tending to urge it in the same direction, if the commanded position differs from the current position of the actuator piston 14.

Upon the amplifier 21 receiving an electrical command signal moving its nozzle 22 in the first direction, for example, the feedback element 77 flexes and imparts an oppositely directed torque on the nozzle 22 which is proportional to the current level of the electrical signal. Absent the feedback elements 77, 77A, 77B, 77C, since there is relatively little resistance to axial movement of the summing structure 37 and the valve element 52, relatively minor electrical signals to the amplifiers 21, 21A, 21B, 21C would tend to move the nozzle 22 sharply to the extreme rightward or leftward positions, thereby causing sharp, severe movement of the summing structure 37 and valve element 52 which could cause damaging transient pressures within the hydraulic conduits 94, 95, 100, 101 leading to the actuator 11 and/or dangerously severe accelerations of the actuator piston 14 and its load.

Since the summing structure 37 forces all the distal ends of the feedback elements 77, 77A, 77B, 77C to the same relative position within their ranges of movement, the equilibrium position of the summing structure 37 is the average of the positions commanded by the fluid amplifiers 21, 21A, 21B, 21C. With respect to each of the fluid amplifiers 21, 21A, 21B, 21C, the difference between the position commanded by the respective fluid amplifier and the current position of the summing structure 37 creates a differential hydraulic pressure across the respective, corresponding one of the piston structures 73, 73A, 73B, 73C. Because the force required to move the summing structure 37 is negligible in relation to the hydraulic forces involved, the net force caused by a differential pressure across any one of the piston structures 73, 73A, 73B, 73C is substantially balanced by a net differential pressure of an opposite sense across the other, (equally sized) piston structures, provided there is no accelerative movement of the summing structure 37. That is, the forces on the summing structure 37 become balanced as the structure reaches an equilibrium position. The system is thus termed a "force summing" system.

By measuring the differential pressure across each of the piston structures 73, 73A, 73B, and 73C, it can be determined how closely the output signal of each fluid amplifier 21, 21A, 21B, and 21C is tracking the average of all the signals. When one amplifier produces an output signal which differs from the average by a predetermined degree, it thus produces a differential pressure across the corresponding piston structure which exceeds a particular level of differential pressure which may be predetermined in accordance with performance requirements of the system, as will be more fully discussed hereinbelow. Therefore, and according to an important feature of the present invention, the performance of each amplifier 21, 21A, 21B, and 21C, and thus of the corresponding electrical components, respectively associated therewith, may be monitored by measuring the differential pressures across each piston structure 73, 73A, 73B, 73C, or across the outlets 35, 36 of each of the associated fluid amplifiers. This permits the use of individual monitoring valves (33), to be described in the following section, which are fluidly isolated from each other, and thus affords an additional element of redundancy for enhancing the reliability of the system 26. The differential pressure monitoring valves 33, 33A, 33B, 33C comprise a further, important feature of the invention; each is fluidly connected to a respective, associated supply conduit 32, 32A, 32B, 32C in series between the fluid inlet 34 of the respective, corresponding fluid amplifier 21, 21A, 21B, 21C and the source of fluid under pressure. As will be understood from the description to follow, each monitor valve 33, 33A, 33B, and 33C comprises a means for shutting off fluid flow to the respective, associated fluid amplifier 21, 21A, 21B, 21C upon the occurrence of a differential pressure between the outlets 35, 36 of the respective, associated fluid amplifier which exceeds a predetermined level. While a preferred embodiment of the monitor valves 33 will be described and illustrated in detail, it should be understood that various other types may be employed, such as those incorporating electromechanical pressure sensing and/or valving mechanisms, which accomplish the above-stated functions of monitoring differential pressures across the piston structures and controlling fluid flow to the fluid amplifiers.

With additional reference to FIG. 4, the construction of a preferred embodiment of the typical, first monitoring valve 33 will now be described. As will be understood from the description, the monitoring valve 33 performs both the monitoring of differential pressure across the outlets 35, 36 of the fluid amplifier 21 and the valving of the fluid supply thereto within a single, compact unit by a hydromechanical mechanism having only one movable valve element (131).

Figures 4, 5:
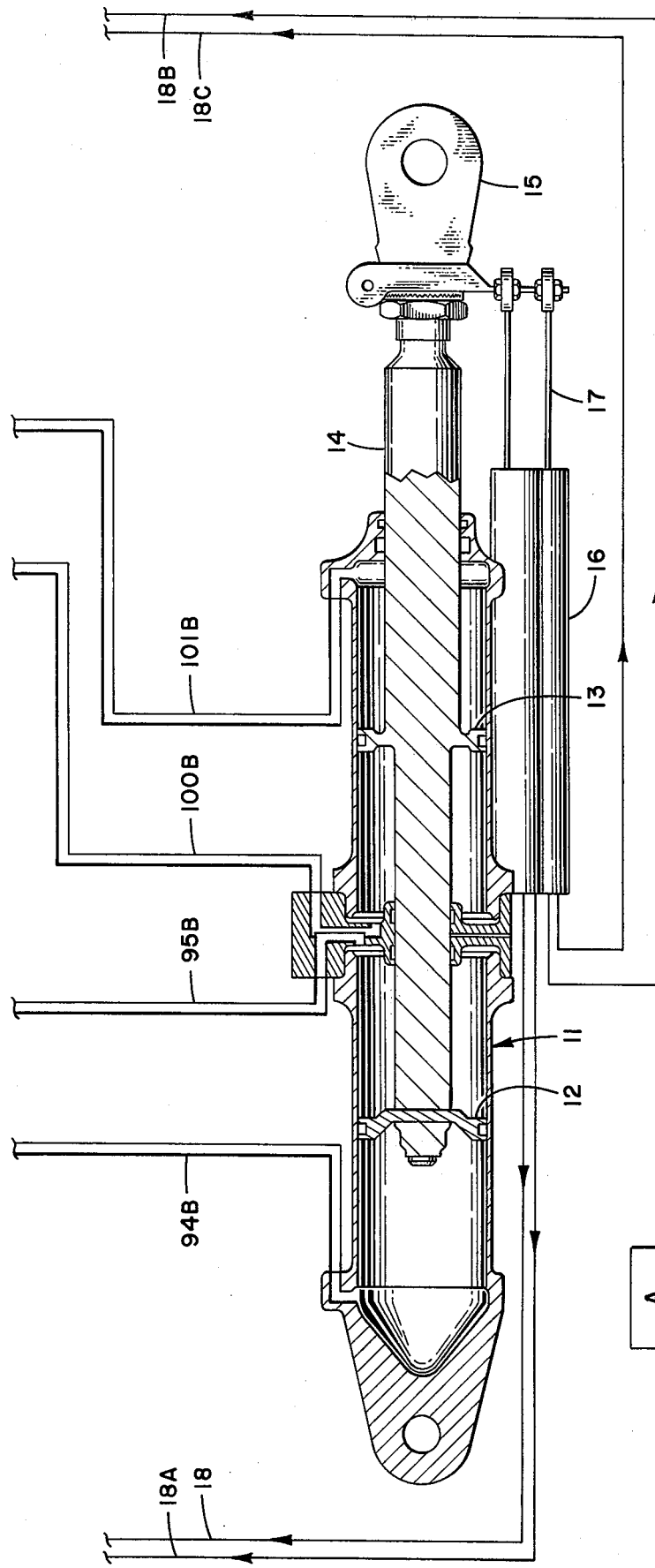
FIG. 5 is a diagram showing the relative positions of FIGS. 1–4, FIGS. 1, 2, 3, and 4 corresponding to segments A, B, C, and D, respectively.

Referring now to FIG. 4, a monitoring valve 33 constructed according to a preferred embodiment includes a cylindrical, tubular valve housing 111 of the type adapted to be sealingly inserted within a corresponding cavity formed within an outer, systems housing such as the first housing segment 27, fragments only thereof being shown in FIG. 4. The present, illustrative embodiment of the valve 33 is of the type having ports, to be described, positioned along the valve housing 111 in a pattern which corresponds to that of corresponding passageways such as the passageways 32, 85, and 86 formed within the outer, systems housing 27, whereby the valve 33 may be removed from the outer housing 27 for maintenance or as otherwise required, according to practices known in the art.

With continued reference to FIG. 4, the valve housing 111 has a channel or chamber 113 extending axially therethrough. First and second, generally cup-shaped plug members 114, 115 are threadingly engaged with the valve housing 111 within opposite end portions of the chamber 113 and serve to close the respective end portions. The plug members 114, 115 each include a respective, cylindrical sidewall portion 116, 117 extending centrally within the housing chamber 113 from respective, base wall portions 118, 119 extending transversely of the sidewall portions 116, 117 and of the valve housing chamber 113. Each of the plug member sidewalls 116, 117 is externally threaded along a portion of its length which portion is adjacent the respective base wall portion 118, 119, the remaining portion having a smooth-surfaced, cylindrical outer surface. The central end portions of the cup member sidewalls 116, 117 are notched, at 116' and 117', to permit communication between the interiors of the cup members 114, 115 and the ports 151, 152, respectively, to be described hereinbelow. First and second O-ring valve seals 120, 121 are seated within corresponding, annular recesses formed coaxially of the valve housing and within the housing inner wall defining the chamber 113, the recesses and seals 120, 121 being positioned circumferentially around the smooth-surfaced portions of the respective, adjacent sidewalls 116, 117 of the first and second plug members 114, 115 upon the plug members 114, 115 being mounted within the chamber 113, the seals 120, 121 being configured to provide a fluid-sealed relationship between the housing 111 and the respective plug members 114, 115.

The portions of the housing chamber 113 within which the plug members 114, 115 extend are preferably of a greater diameter than the remaining, central portion extending between them, the central portion being defined by a central, cylindrical wall portion 122 of reduced diameter. First and second, annular shoulders 123, 124 extending radially outwardly from the central cylindrical wall portion 122 are thus defined adjacent the respective ends of the central wall portion 122.

First and second, tubular bushings 125, 126 are fixedly seated within the central wall portion 122 of the chamber 113, the bushings 125, 126 having respective, radially outwardly extending head portions 127, 128 disposed adjacent but external the central, cylindrical wall portion 122 and seated against the first and second annular shoulders 123, 124 respectively. The respective surfaces of the bushing head portions 127, 128 facing outwardly of the central wall portion 122 are substantially flat, and extend transversely with respect to the longitudinal axis of chamber 113. Third and fourth, O-ring valve seals 129, 130 are seated within corresponding, annular recesses formed circumferentially of the first and second bushings 125, 126 respectively, and are positioned in sealing associated with the central wall portion 122 for ensuring fluid tight seals between the bushings 125, 126 and the housing 111.

A spool type valve member 131 is slideably mounted within the chamber 113, the valve member having a central, spool portion 132 which is machined to provide sliding and substantially sealing association between the outer, cylindrical surface of the spool portion 132 and the central, inner wall portion 122 of the housing 111. The valve member 131 additionally has first and second, substantially cylindrical plungers 133, 134 coaxial of the spool portion 132, projecting outwardly from respective, opposite end portions of the spool portion 132, and extending coaxially within the first and second, tubular bushings 125, 126 respectively. The first and second plungers 133, 134 are machined to fit sealingly and slidingly within the first and second bushings 125, 126 and, in cooperation with the bushings and the third and fourth O-ring seals 129, 130, and thus effective to isolate the portion of the chamber 113 extending between the two bushings 125, 126 from the remaining portions disposed beyond the bushings. Thus, a first, annular, chamber portion 135 is defined between the first bushing 125 and the valve member spool 132, the spool 132 having a first, annular piston face area 136 defining one side of the first chamber portion 135 and facing in a first axial direction or toward the first bushing 125. Similarly, a second, annular, chamber portion 137 is formed between the second bushing 126 and the valve member. The spool 132 has a second, annular, piston face area 138 defining one side of the second chamber portion 137 and facing in a second axial direction or toward the second bushing 126.

Third and fourth chamber portions 139, 140 are formed in the portions of the chamber 113 beyond the bushings 125, 126, the third chamber portion 139 extending from the first bushing 125 to the base wall 118 of the first plug member 114 and the fourth chamber portion 140 extending from the second bushing 126 to the base wall 119 of the second plug member 115.

Within the third and fourth chamber portions 139, 140 are positioned first and second disc membes 141, 142, each of a slightly smaller diameter than the inner diameter of the corresponding, adjacent plug member 114, 115, respectively, and each positioned in abutting relationship with the flat, outwardly facing base surface of the respective, adjacent, bushing head portion 127, 128. The first and second disc members 141, 142 have respective central orifices or channels 143, 144 formed therethrough for providing communication between the third and fourth chamber portions 139, 140 and the first and second plungers 133 and 134, respectively. A first coiled spring 145 extends within the third chamber portion, axially of the first plug member 114, and has one end footed against the base wall 118 of the plug member and another end footed against the first disc member 141 to partially compress the spring. A second coiled spring 146 is similarly mounted within the fourth chamber portion 140 and footed between the second disc member 142 and the base wall 119 of the second plug member 115. The first and second coiled springs 145, 146 are of equal spring rates and are compressed by substantially equal amounts, whereby the valve member 131 tends to remain in its centered position provided the springs are not overcome by other forces urging the valve member axially.

Third and fourth piston face areas 147, 148 are defined by the distal end surfaces of the first and second plungers 133, 134, the piston face areas 147, 148 facing in the first and second directions, respectively, and contacting the first and second disc members 141, 142, respectively, upon the disc members abutting against the first and second bushings 127, 128, respectively.

The valve 33 is provided with a first, or inlet port 149 extending through the housing 111 and a second, or outlet port 150 extending through the housing, the inlet and outlet ports suitably being coaxially aligned and bisected by a plane perpendicular to the longitudinal axis of the valve housing 111. The inlet port 149 communicates with the portion of the fluid supply conduit 32 which extends to the source of fluid under pressure 29 (FIGS. 2 and 3) and the outlet port 150 communicates with the portion of the fluid supply conduit 32 extending from the monitoring valve 33 to the fluid amplifier 21 (FIGS. 1 and 2).

Third and fourth ports 151, 152 are also formed through the housing 111 adjacent the head portions 127, 128 of the first and second bushings 125, 126, respectively, the third and fourth ports 151, 152 having communication with the third and fourth chamber portions 139, 140, respectively. In the present embodiment, the third and fourth ports 151, 152 are duplicated by redundant ports 153, 154 positioned diametrically opposite the third and fourth ports 151, 152, respectively. The ports 151, 153 and the ports 152, 151 communicate radially outwardly with respective grooves extending circumferentially around the housing 111, and the redundant ports 153, 154 thus serve to enhance fluid communication between the chambers 139, 140 and the outer, circumferential grooves. In the present embodiment, these circumferential grooves are covered by adjacent portions of the outer, system housing 27 at all portions thereof except the areas adjacent ports 151, 152, at which communication is provided with passageways 85, 86, respectively.

The housing 111 additionally has at least one drain opening 155 formed therethrough and having communication with the chamber 113 at a location along the housing 111 spaced between the second port 150 and the fourth port 152. The drain opening 155 communicates with the fluid return passageway (FIGS. 2 and 3) via a respective drain passageway 100.

Figure 6:
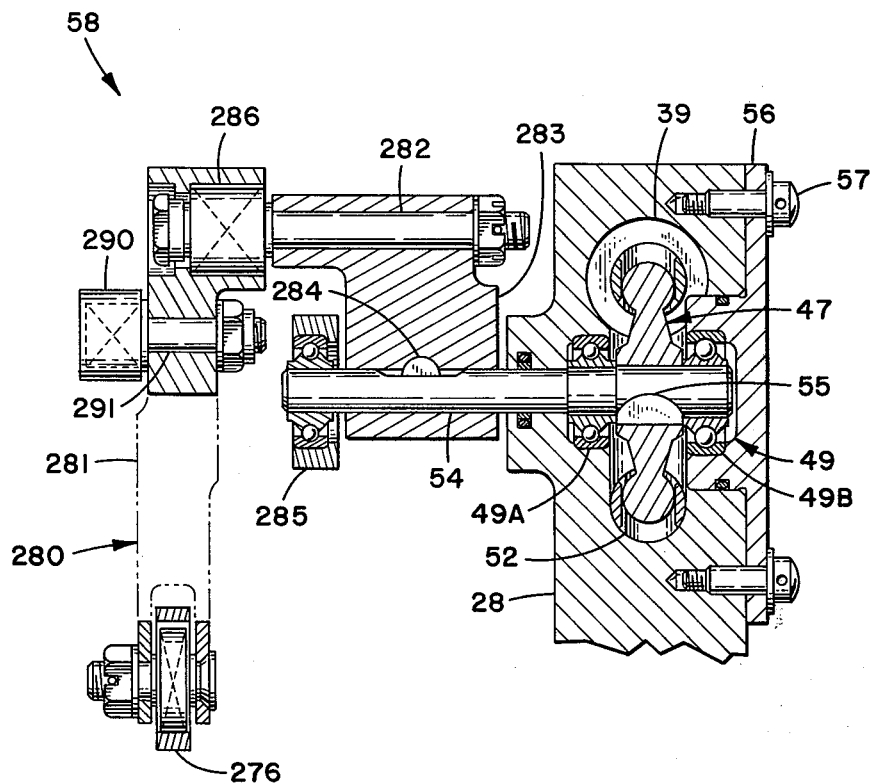
FIG. 6 is a cross-sectional view taken as on line VI — VI of FIG. 1 and showing the bearing structure supporting the second rocker arm of the structure of FIG. 1.

First, second, and third annular grooves or annuli 156, 157, 158 are formed circumferentially of the valve spool portion 132, the first, second, and third annuli being spaced successively along the spool 132 in the second direction, or rightwardly as viewed in FIGS. 4 and 6.

Upon the valve member 131 being positioned with its first and second plungers 133, 134 in contact with the first and second disc members 141, 142, respectively, the disc members 141, 142 are in contact with the first and second bushings 125, 126, respectively, and the spool portion 132 is centrally located between the first and second bushings. When the valve member 131 is in its centered position, the first annulus 156 is aligned with the first and second ports 149, 150 and thus provides communication therebetween. For reasons which will become apparent, the first port 149 is of a diameter greater than the width of the first annulus 156, and the width of the first annulus 156 is greater than the diameter of the second port 150.

A first axial bore 159 extends axially within the spool portion 132, the first axial bore 159 having communication with the first chamber portion 135 and extending, from the first, annular piston face area 136 and in the second direction, within the spool 132 to a location adjacent the third annulus 158. Similarly, a second axial bore 160 extends, in the opposite direction, from the second piston face area 138 to a location within the spool 132 adjacent the first annulus 156.

First and second restrictive passageways 161, 162 communicate between the first annulus 156 and the first and second axial bores 159, 160, respectively. Similarly, a third passageway 163 communicates between the second axial bore 160 and the second annulus 157, and a fourth passageway 164 communicates between the first axial bore 159 and the third annulus 158.

The valve member 131 is axially slideable within the chamber 113 from a position in which its first annular piston face 136 seats against the first bushing 125 to a position, as shown in FIG. 6, in which its second, annular piston face 138 seats against the second bushing 126. For clarity of reference, the above-noted range of movement of the valve member 131 is divided into five positional ranges, consecutive in the second direction or from left to right, as will now be described. In its central, or third positional range, the first annulus 156 is in communication with the first and second ports 149, 150 and thus comprises a passageway communicating between the ports 149, 150. When the valve member and second spool 132 is centered between the first and second bushings 125, 126, the portion of the spool 132 extending between the second and third annuli 157, 158 is disposed in register with the drain opening 155 and serves to close the drain opening, thus to prevent any loss of fluid through the drain opening 155. Upon the valve member 131 moving in the first (left) direction, the third annulus 158 becomes in register with the drain opening 155. The first and third annuli 156, 158 are positioned in sufficiently close relationship, relative to the spacing and size of the second port 150 and the drain opening 155, to permit the complete closure of the second port 150 by the portion of the spool 132 between the first annulus and the first annular piston face 136 when the valve member is moved in the second direction to the extreme rightward position shown in FIG. 6.

The fourth positional range is defined as that range of positions beginning, as the valve member 132 is moved in the second direction from its third positional range, when the second annulus 157 initially communicates freely with the drain opening 155 and ending when the second port 150 is completely closed by the portion of the spool extending between the first annulus 156 and the first piston face 136. The fifth positional range extends from the latter position to that shown in FIG. 6 wherein the second piston face area 138 of the spool 132 contacts the second bushing 126.

The first port 149 is sufficiently wider than the first annulus 156 to permit some communication therebetween during all relative positions of the valve member 131, even, for example, in the position shown in FIG. 6 wherein the spool 132 abuts the second bushing 126; similarly, there remains an opening between the first port 149 and the first annulus 156 upon the valve member being moved in the opposite axial direction until the first piston face 136 contacts the first bushing 125.

The second and first positional ranges are defined similarly, but with respect to movement of the spool 132 in the first direction from its third positional range. As the valve member 131 is moved in the first direction through its third positional range, the portion of the spool 132 extending between the second and third annuli 157, 158 remains in covering relationship with the drain opening 155. The second positional range is defined as that range beginning, as the valve member 131 is moved in the first direction from its third positional range, when the third annulus 158 first communicates freely with the drain opening 155 and ending when the second port 150 is completely closed, by the portion of the spool 132 extending between the first and second annuli 156, 157. The first positional range is defined as that beginning at the latter position, wherein the second port 150 is first closed by the spool 132, and ending as the valve 131 is stopped from further movement in the first direction by contact of the first piston face 136 with the first bushing 125.

The valve 33 is thus operable to conduct fluid, from a source, not shown, of fluid under pressure communicating from fluid supply source 29 (FIG. 3) with the first orifice 149, through the first annulus 156 and the second port 150 when the valve member 131 is in its second, third, or fourth positional ranges. As will be described in the paragraphs to follow, the valve 33 is operable to shut off fluid flow therethrough upon the occurrence of a predetermined pressure differential between first and second portions of a fluid system, i.e., between chamber portions 83, 84, or between fluid amplifier outlets 35, 36 (FIG. 1).

The operation of the valve 33 will initially be described with reference to FIG. 4 wherein the valve member 131 is centered within its third positional range. In the description to follow, the movement of the valve member 131 will be described in terms of leftward and rightward movement with reference to the drawing, it being understood that such terminology is employed for clarity of description only and is not meant to limit the valve to a particular configuration or orientation. When the valve member 131 is in its third positional range, fluid flow is permitted from the first to the second ports, 149, 150, and from thence through conduit 32 to the fluid amplifier 21 (FIG. 1). During normal operation of the fluid amplifier 21, the fluid flow thus received is ejected through jet nozzle 22 partially into outlet 35 and partially into outlet 36 whereby a pressure differential is created across the piston structure 73. The fluid pressure existing within the first chamber portion 82 is transmitted, via conduit 85 and the valve third port 151 (FIG. 4) and through the notched portion 116' of the plug member sidewall 116, to the valve third chamber portion 139, within the first plug member 114. Similarly, fluid pressure within the second chamber portion 83 (FIG. 1) is transmitted through conduit 86 and the valve fourth port 152 (FIG. 4) to the fourth chamber portion 140. Fluid pressure within the third chamber portion 139 is applied to the third piston face area 147, of the first plunger 133, through the opening 143 in the disc member 141. Correspondingly, fluid pressure within the fourth chamber portion 140 exerts a pressure upon the fourth piston face area 148 of the second plunger 134. Because the third and fourth piston face areas 147, 148 are of equal area, it will be apparent that there will be no net force tending to move the piston member 131 axially when equal pressures exist within the third and fourth chamber portions 139, 140. Moreover, the first and second coil springs 145, 146 act to urge continuously the valve member 131 towards its centered position as shown in FIG. 4. Upon the occurrence of a drop in pressure in the second chamber portion 83 (FIG. 1) whereby the pressure within second chamber portion 83 drops below that of first portion 82, however, the pressure differential between first and second chamber portions 82, 83 will be transmitted to the third and fourth ports 151, 152 and will result in a drop in pressure within the fourth chamber portion 140 relative to the pressure within the third chamber portion 139. The differential pressure thus effected within the valve 33 exerts a net force upon the valve member 131 tending to urge it to the right. Any forces tending to move the valve member 131 from its centered position are resisted by one of the first and second springs 145, 146, so that insignificant variances in pressure between chamber portions 82 and 83 (FIG. 1) do not cause any movement of the valve member 131. Assuming, however, that the loss in fluid pressure within second chamber portion 83 (FIG. 1) causes a net fluid pressure differential resulting in a force which is greater than the resistance to rightward movement of the valve member 131 caused by the second spring 146, fluid pressure will then begin to translate the valve member 131 to the right. As the valve member 131 moves to the right, fluid within the valve second, annular chamber portion 137 is caused to flow therefrom and successively through the second axial bore 160, the second restrictive passageway 162, the first annulus 156, the first restrictive passageway 161, and the first axial bore 159, to the first, annular chamber portion 135, the restrictive passageways 161, 162 and the bores 160, 159 thus serving frictionally to resist movement of the valve member 131 with a force proportional to the rate of movement thereof. The bores 159, 160 and the passageways 161, 162, in combination with the first and second chamber portions 135, 137 thus comprise means for preventing movement of the valve member 131 from its third positional range upon the occurrence of transient differential pressures between the third and fourth ports 151, 152 of a level above a predetermined level at which movement of the valve member 131 from its third positional range would ultimately occur but of a duration less than a predetermined time period, for a given pressure level.

Assuming that a substantial, non-transient pressure differential exists which is of a level sufficient to move the valve member 131 to the right against the opposing force of the second spring 146, the valve member 131 then translates to the right, further compressing the spring 146. If the differential pressure is of a value less than the predetermined level at which shut off of fluid flow is desired, an equilibrium condition will be reached before the valve member 131 leaves its third positional range because of the increased force exerted, at the equilibrium position, by the more fully compressed, second spring 146. If the differential pressure is above the predetermined level, however, the valve member 131 will be translated rightwardly to the fourth positional range (in which the second annulus 157 registers and communicates with the drain opening 155); upon the valve member 131 thus entering the fourth positional range, fluid pressure within the second, annular chamber portion 137 is significantly reduced by the passage of fluid from chamber portion 137 through the second axial bore 160, the third restrictive passageway 163, the second annulus 157, and through the drain opening 155. It will be noted that no such drainage outlet is opened to the first cavity 135, in that the third annulus 158 is then closed by the surrounding wall of the valve housing 111. Both annular chamber portions 135, 137 receive fluid under pressure from the first port 149 through the first annulus 156 and respective ones of the axial bores 159, 160. However, the reduction of pressure within the second chamber portion 137 by fluid flow therefrom through the drainage opening 155 induces a substantial net force upon the valve member 131 serving to urge the valve member 131 to the right through the remainder of the fourth positional range and into the fifth positional range, in which the portion of the spool 132 extending between the first annulus 156 and the valve first, annular piston face area 136 covers the second port 150 and prevents further passage of fluid therethrough. Upon the second port 150 being closed, fluid entering the valve 33 through its first port 149 continues to exert a net force on the valve member 131 urging it to the right, and the valve member 131 is translated to the right until it is stopped by contact of the second piston face 138 with the second bushing 126.

The valve 33 thus remains closed so long as fluid under pressure is received through the first port 149. Upon the excessive differential pressure between chamber portions 82, 83 (FIG. 1) being removed, however, the valve 33 may be reopened by temporarily shutting off fluid flow through the port 149, whereupon the second coil spring 146 acts to move the valve member 131 back to its centered position shown in FIG. 4. Such temporary termination of fluid flow to the valve 33 may be accomplished by actuation of the first remotely controllable shutoff valve 31 (FIG. 2). A normally open, pressure sensing switch 102 (FIG. 1) may be connected to the supply conduit 32 between the valve 33 and the fluid amplifier 21 for closing a circuit to a remote warning light (not shown) when the fluid pressure within the supply conduit 32 is shut off. As will be apparent to those in the art, operation of the monitor valve 33 to shut off fluid flow upon the occurrence of a differential pressure from a loss of pressure in the first chamber portion 82 (FIG. 1) with respect to that in the second chamber portion 83 causes the valve member 131 to move to the left in the second chamber portion 83 causes the valve member 131 to move to the left from its third positional range, through its second and into its first range, in the same manner as has been described above with respect to rightward movement. Upon the valve member 131 entering its second positional range, fluid within the first, annular chamber portion 135 is permitted to drain through the first axial bore 159, the passageway 164, and the drainage opening 155.

It will thus be seen that the first and second springs 145, 146 and the third and fourth, piston face areas 147, 148, in cooperation with the first and second disc members 141, 142 and the first and second, tubular bushings 125, 126, comprise a pressure responsive means, responsive to differential pressure between the third and fourth ports 151, 152, and thus, between the first and second chamber portions 82, 83 and between the amplifier outlets 35, 36 (FIG. 1), for constraining the valve member 131 within its third positional range when any difference between the pressure level within the first and second amplifier outlets 35, 36 is below the predetermined amount; for moving the valve member 131 from its third to its second positional range upon the pressure at the amplifier second outlet 36 falling below that in the first outlet 35 by the predetermined amount; and for moving valve member 131 from its third to its fourth positional range upon the pressure in the amplifier first outlet 35 falling below that in the second outlet 36 by the predetermined amount. The differential pressure responsive means also comprises means for moving the valve member 131 from its first to its third positional range and, alternatively, from its fifth to its third positional range, upon fluid flow into the valve 33 through the first port 149 being shut off.

The first and second chamber portions 135, 137, in cooperation with the valve first and second, annular piston face areas 136, 138 and the valve housing 111 and in cooperation with the axial bores 159, 160, the annuli 156, 157, 158, and the restricted passageways 161, 162, 163, 164, provide a latching means, employing fluid pressure, for moving the valve member 131 entering its second positional range when fluid under pressure is received through the first port 149 and, alternatively, for moving the valve member from its fourth to its fifth positional range upon the valve member entering its fourth positional range. The latching means additionally comprises means, actuated by fluid under pressure received through the first port 149, for constraining or "latching" the valve member 131 in its first positional range upon the valve member being moved to its first positional range by the latching means; and, alternatively, for constraining the valve member 131 in its fifth positional range upon the valve member being moved to its fifth positional range by the latching means.

While the valve 33 as thus shown and described represents a preferred embodiment, it will again be recognized by those in the art that various modifications may be made in its construction within the scope of the appended claims. The valve 33 is of the type disclosed in my copending application for U.S. Pat. Ser. no. 357,984 filed 7 May 1973, in which application a modification of its construction is described in detail. It will be understood by those in the art that the operating characteristics of the valve 33 may be controlled as desired by appropriate design and sizing of several of its components. Determination of the various dimensions preferred for precise operating results in a particular application necessarily entails an at least partially empirical study. As an example, however, and with reference to the embodiment of FIGS. 4-6, it has been experimentally determined that when the valve 33 is intended to receive fluid under a pressure of approximately 3,000 psi through its inlet port 149; is intended to shut off flow upon the occurrence of a pressure differential of 60 percent of a maximum differential pressure of 2,250 psi available between ports 151 and 152 from amplifier 21; and wherein operation of the valve to shut off fluid flow is desired to occur within a time of about 0.036 seconds (and in which it is desired to move the valve member 136 to its second or fourth position within 0.025 seconds) following the initiation of a continuous, 60 percent pressure differential, the following design parameters are satisfactory: plungers (133,134) of 0.163 inch diameters, spool diameter of about .390 inches, valve element (131) total axial movement of 0.2 inches, and total movement, within its third positional range, of 0.064 inches, drain orifice (155) diameter of 0.017 inches, restrictive, first and second passageways (161,162) of 0.015 inch diameters, and coiled springs 145, 146 having spring rates of about 51 pounds/inch and pre-load of 24.4 pounds. Reduction of the respective diameters of the passageways 161, 162 and/or the drain opening 155 would increase the time of response, while increasing those diameters would decrease the time of response.

It will thus be seen that the fluid monitoring and control valve 33 provides an efficient yet practicable means for shutting off fluid flow to the amplifier 21 upon the occurrence of a pressure differential above a predetermined level between the fluid outlets 35, 36 of the amplifier. The valve 33 comprises a means for continuously monitoring the difference in pressure between two fluid outlets 35, 36 and includes means for positively latching the valve 33 in an "off" position (in its first or fifth position) so long as fluid under pressure is received through the first port 149. The valve is of rugged, durable construction, having only one major movable part.

The servo control system thus provides a majority voting, multiple channel control system in which each channel is fluidly isolated, and whereby failures or leakages from particular channels are isolated from and do not affect the remaining channels. Because of the force-summing technique wherein a single, movable summing structure is employed, only small displacements of the movable structure are required, and the fluid amplifier units can be of quite small and light construction. The fact that each piston structure 73 is fluidly isolated from the others permits the use of the discrete, differential pressure monitoring valves 33 and thus avoids the problems, previously discussed, related to the complexity of cross-channel monitoring apparatus. This fluid isolation of the several channels, and the use of monitoring valves 33 to shut off supply flow to malfunctioning electrohydraulic fluid amplifiers, permits convenient adaptation of the fail-safe valving system 170 to the servo control system 26, as will become apparent from the description to follow. Moreover, the preferred use of jet pipe, electrohydraulic valves avoids the necessity of multiple valving to isolate and/or to bypass a failed transducer. That is, the fluid channels passing between the chamber portions 82, 83 and through the fluid amplifier 21 via outlets 35, 36, for example, include no restrictive orifices or the like which would frictionally oppose fluid flow therethrough and thus impart a passive resistance to axial movement of the movable structure 38; and thus, no failure-responsive bypass system is needed between chamber portions 82, 83. Again because of the fluid isolation of the channels and the use of discrete monitoring valves, deactivation of failed channels occurs within a small fraction of a second, and spurious transient signals caused by failures, and transients which could be caused by deactivation of particular channels, are minimized. The use of the differential pressure monitoring technique permits the use of monitoring valves whose threshold (e.g., 60 percent of maximum differential pressure) is substantial, thus obviating the problem of channel shutdowns because of spurious, transient pressure changes.

From the foregoing description of the servo control system 26, the interrelationship of the fail-safe valving system 170 with portions of the servo control system can be more clearly discussed; the failsafe valving system 170, termed hereinafter the valving system 170, will now be described in detail. The valving system 170, in its preferred embodiment, includes first and second, elongated valving members 171, 172 slideably and sealingly inserted within corresponding, first and second, cylindrical valving chambers 171', 172' extending within the first and second housing segments 27, 28, respectively, along respective axes suitably parallel to the longitudinal axis of the flow control valve 53 but spaced laterally from each other. The outboard end portions of the valving members 171, 172 have respective, coaxially, and outwardly projecting plungers 173, 174 of reduced diameters and which extend toward and, upon the first and second valving members 171, 172 being positioned in their extreme outboard positions (their extreme leftward and rightward positions, respectively, as viewed in the drawing), butt against first and second elongated stop members 175, 176, respectively, which are slideably mounted within the outboard end portions of the valving chambers 171', 172'. The first and second, elongated stop members 175, 176 have respective head portions 177, 178 adapted to seat against first and second valving member plug members 180, 181, respectively, which are suitably threadingly engaged within the parallel valving chambers 171', 172', respectively, and positioned adjacent the external, side surfaces of the first and second housing segments 27, 28 for facilitating assembly and maintenance of the valving system 170. The first elongated stop member 175 and the plunger 173 of the first valving member 171 extend coaxially within a first, coiled, actuating spring 182 footed under compression between and against the first stop member head portion 177 and the step defined between the first plunger 173 and the non-reduced, outboard end portion of the first elongated valving member 171, for resiliently urging the valving member 171 inboard, or in the second direction. Similarly, a second actuating spring 183 foots against the second stop member head portion 178 and the second, elongated valving member 172 for urging the second valving member 172 in the first direction.

The inboard end portions of the first and second, elongated valving members 171, 172 abut respective first and second spherical end portions 184, 185 of a third, pivotable, rocker arm 186, similar to the first and second rocker arms 46, 47 (FIG. 1) and mounted by a suitable bearing structure 187 seated within structure, not shown, supported from the housing 26, for permitting rotational movement of the rocker arm 186 in walking beam fashion about an axis perpendicular to a plane coincident with the longitudinal axes of the elongated valving members 171, 172, suitably coincident with the plane defined by the interface between the housing segments 27, 28, and centered between the longitudinal axes of the valving members 171, 172. Bearing structure 187 suitably comprises inner and outer bearing assemblies, not shown, of the type described above with respect to the second bearing structure 49 (FIGS. 1 and 6). The third rocker arm 186 is similarly keyed to an axle 188 which is rotatably journalled within the bearing structure 187 in the same manner described above with respect to axle 54 (FIG. 6). Axle 188 projects outwardly of the housing 26 for supporting elements of the fail-safe linkage system, as will be described hereinafter with reference to FIG. 6. A cavity 190 is provided within the housing 26 for accommodating the rocker arm 186 and permitting pivotal movement thereof in both rotational directions from a medial position in which the arm is parallel to the interface of housing segments 27, 28.

A first elongated chamber 192 is formed within the second housing segment 28 coaxially of the first valving chamber 171', communicating with the cavity 190, and extending in the second direction from the cavity 190. The elongated chamber 192 includes a midportion 192A of uniform diameter, a first enlarged portion 192B of relatively greater diameter extending from the midportion 192A to the cavity 190, and a second enlarged portion 192C extending, in the second direction, from the midportion 192A to the end of the elongated chamber 192 remote from the cavity 190. A first, stepped plunger member 194 is slidingly mounted within the first elongated chamber 192 and has a first portion 195 which abuts the first end portion 184 of the rocker arm 186 and extends therefrom within the first enlarged portion 192B of the first elongated chamber 192 and has a second portion 196, of reduced diameter relative to the first portion, which extends from the chamber first portion and fits sealingly and slidingly against the walls of the chamber 192 within the chamber midportion 192A.

An annular seal 197 is seated within a corresponding annular recess formed in the housing segment 28 coaxially of the first enlarged chamber portion 192B adjacent the plunger member first portion 195. An annular wiper member 200 is similarly mounted circumferentially around the first plunger member portion 195 and at a location spaced between the cavity 190 and the seal 197, for wiping the plunger first portion 195 of foreign particles or dust which may collect upon the portion thereof extending within the cavity 190 during use.

A first slidable stop member 201 is also slideably fitted within the first elongated chamber 192 and has a head portion 202 slideably and sealingly fitted within the chamber second enlarged portion 192C and a body portion 203 extending from the head portion 202 within the chamber midportion 192A and fitted slidingly against the wall of the chamber portion 192A. An annular seal 204 is seated circumferentially of the body portion 203 adjacent its end remote from the head portion 202. The stop member 201 is slideably, from the position shown in the drawing in which its head portion seats against the radial stop between the chamber portions 192A and 192C, in the second direction to a position in which the head portion 202 seats against the transversely extending wall 205 of the chamber 192 remote from the cavity 190. The wall 205 is defined by a plug member, not shown, similar to plug member 181.

The first, stepped plunger member 194 defines first and second piston faces 206, 207 each facing in the second direction, the first being formed by an annular surface extending radially from the second to the first plunger portions 196, 195, and the second being defined by the end face of the second plunger portion 196. The second plunger portion 196 is of sufficient length to permit contact of its second piston face 207 with the stop member 201 upon the stop member head portion 202 contacting the transverse, chamber wall 205.

A second elongated chamber 210 is formed in the first housing segment 27 and is similar to the first elongated chamber 192, but extends in the first direction from the cavity 190, coaxially of the second elongated valving member 172. A second, stepped plunger member 211 and a second stop member 212, respectively identical to the first plunger member 194 and the first stop member 201, are similarly mounted within the second elongated chamber 210. The second, stepped plunger member 211 has an end portion abutting the second spherical end portion 185 of the rocker arm 186 and has first and second piston faces 213, 214 corresponding to the first and second piston faces 206, 207 of the first, stepped, plunger members 194.

An annular seal 215 is seated circumferentially of the second stop member 212, as is the seal 204 of the first stop member 201, for fluidly isolating the portion of the chamber 210 on one side of the seal 215 from that on the other side. The second stop member 212 is slideable longitudinally of the chamber 210 and has a head portion 216 which faces, in the first direction, toward a transverse end wall 217 of the chamber 210 corresponding to end wall 205 of the first elongated chamber 192.

First, second, third, and fourth fluid receiving passageways or conduits 220, 220A, 220B, and 220C, respectively, are provided, suitably as passageways extending through the housing 26, for communicating between portions of the valving system 170, as will be described, and with the first, second, third, and fourth fluid supply conduits 32 (FIG. 1), 32A and 32B (FIG. 2), and 32C (FIG. 1), respectively at respective locations on the supply conduits downstream of the associated monitor valves 33, 33A, 33B, and 33C, respectively.

The third fluid receiving passageway 220B communicates with the first enlarged portion 192B of the first elongated chamber 192 at a location adjacent the chamber midportion 192A and spaced between the midportion 192A and the first piston face 206 of the stepped plunger 194, or at the chamber portion communicating with the first piston face 206. The second fluid receiving conduit 220A communicates with the second elongated chamber 210 at the corresponding portion thereof, i.e., at that portion having communication with the first piston face 213 of the second, stepped plunger member 211. The fourth fluid receiving conduit 220C has communication with the midportion 192A of the first elongated chamber 192 at a location therein spaced between the first stop member 201 and the first, stepped, plunger member 194 during all possible positions of the stop member 201 and the plunger member 194 within the chamber 192, as will be described. Thus, the fourth, fluid receiving conduit 220C communicates with that portion of the first elongated chamber 192 which communicates with the second piston face 207 of the first plunger. Similarly, the first, fluid receiving conduit 220 communicates with the corresponding portion of the second elongated chamber 210 which portion communicates with the second piston face 214 of the second, stepped, plunger member 211. As will become apparent from the description to follow, the above-described arrangement can be altered by connecting the conduits 220, 220A, 220B, and 220C with respective ones of the four described portions of the chambers 192, 210 in any relative order without functionally altering the system 170. It is preferable, however, that the first and second conduits 220, 220A communicate with the second chamber 210 and that the third and fourth conduits 220B, 220C communicate with the first chamber 192 in order that the components in the two housing segments 27, 28 may be fluidly isolated, to preserve operability of the fluid system (26) should a loss of fluid pressure develop with respect to components in only one of the housing segments 27, 28. Additionally, inlet and drain passageways 222 and 223 extend, within the first housing segment 27, between the flow control valve 53 and the second elongated chamber 210, the inlet or supply conduit 222 having communication with the chamber 210 at a location adjacent the chamber end wall 217 and, at its opposite end, having communication with the third external annulus 103B of the flow control valve 53, an additional outlet 224 suitably being formed through the valve housing 90 at a location thereon in alignment with the fluid inlet 91. The return passageway 223 similarly communicates between the first external annulus 103 of the flow control valve 53, and the second elongated chamber 210 at a location therein spaced in the second direction from and immediately adjacent the enlarged portion enclosing stop member head portion 216, or at a location which is spaced between the head portion 216 and the seal 215 of the stop member 212 during any permissible position of the stop member 212. Corresponding inlet and return passageways 225 and 226 communicate similarly between the first elongated chamber 192 and corresponding portions of the segment of the flow control valve 53 extending within the second housing segment 28. The return passageway 226 communicates, at one end portion, with the first elongated chamber 192 at a portion thereof always positioned between the seal 204 and the head portion 202 of the stop member 201, i.e., at the chamber midportion 192A and immediately adjacent the chamber second enlarged portion 192C. At its opposite end, the return passageway 226 communicates, through an annulus 103E and orifices 227, 227A, with the interior of the flow control valve 53 at a location aligned with the second return or drainage outlet 72, the orifice 227 corresponding to the first return orifice 96. The inlet passageway 225 communicates, at one end, with the first housing second enlarged portion 192C adjacent the end wall 205 and, at its opposite end, with an annulus 103F communicating with an outlet port 228 of the servo control valve 53 and with the second fluid supply source 30.

The first elongated valving member 171 has first and second annular grooves 230, 231 formed circumferentially thereof at locations respectively in register with the conduits 94, 95 communicating with the first and second fluid outlets 92, 93, respectively, of the flow control valve 53 upon the valving member 171 being in its fully retracted position as in FIG. 3. The conduits 94 and 95 have portions 94A and 94B, respectively, communicating between the servo valve outlets 92, 93, respectively, and the first valving chamber 171'; upon the first valving member 171 being positioned in its retracted position (abutting the first elongated stop member 175), conduit portions 94A and 95A communicate with the valving member 171 first and second annular grooves 230, 231. Portions 94B, 95B of the conduits 94, 95, respectively, then similarly communicate between the first and second annular grooves 230, 231, respectively, and with the actuator 11 (FIG. 4). Similarly, the second elongated valving member 172 has corresponding, first and second annular grooves 232, 233 which communicate, upon the second elongated valving member 172 being positioned in its retracted position abutting the elongated stop member 176, with corresponding portions 100A, 100B of the conduit 100 and with portions 101A and 101B of conduit 100, portions 100B and 101B communicating with the actuator 11. The width and depth of annular grooves 230, 231, 232, and 233 are sufficiently great to permit substantially unrestricted fluid flow through conduits 94, 95, 100, and 101 via the respective associated grooves. The first valving member 171 additionally has first and second annular orifices 234, 235 respectively spaced, adjacently, in the first direction from the first and second grooves 230, 231 and oriented to communicate, respectively, between conduit portions 94A, 94B and between conduit portions 95A, 95B upon the first valving member 171 being positioned in a medial position in which the first valving member 171, the first end portion 184 of the rocker arm 186, the first stepped plunger member 194, and the stop member 201 are, successively, in mutual contact and in which the stop member head portion 202 seats against the radial step between the first chamber midportion 192A and its second enlarged portion 192C.

Each annular orifice 234, 235 comprises an annular groove of relatively narrower width and lessor depth than the grooves 230, 231, and the orifices 234, 235 thus serve to restrict fluid flow through the conduits 94, 95. The second elongated valving member 172 has corresponding first and second annular orifices 236 and 237 respectively spaced in the second direction from the first and second grooves 232 and 233 and positioned to communicate with conduits 100, 101, respectively, when the second valving member 172 is in a medial position corresponding to that described with respect to the first valving member 171. The annular grooves 230, 231, 232, and 233 are spaced sufficiently from the orifices 234, 235, 236, and 237, respectively, to prevent fluid flow through the annular grooves when the valving members 171, 172 are in their medial positions, the outer surfaces of the valving members being closely and sealingly fitted within their associated chambers. The springs 182, 183 are of sufficient length to move the first and second valving members 171, 172 to a fully projected position (not shown) in which the rocker arm 186 is rotated in a counterclockwise direction against the stepped plungers 194, 211 until the plungers are driven into contact with the elongated stop members 201, 212, respectively, and in which the stop members 201, 212 are translated outwardly and into contact with the chamber end walls 205 and 217, respectively.

The first actuating spring 182 continuously urges the first elongated valving member 171 in the second direction, and the second actuating spring 183 urges the second elongated valving member 172 in the first direction, thus tending to rotate the third rocker arm 186 in a counterclockwise rotational direction as viewed in the drawing. Such counterclockwise rotation of the rocker arm 186 is normally opposed by the stepped plunger members 194, 211 because of fluid pressures which urge the plunger members against the rocker arm 186, thus opposing the action of the actuating springs 182, 183. Fluid under pressure is conducted from the first and second fluid supply conduits 32, 32A (FIG. 1), via the first and second fluid receiving conduits 220, 220A, respectively, to the second elongated chamber 210 at respective, fluidly discrete portions thereof communicating with the second and first piston faces 214, 213 of the second plunger 211, as have been described previously. Similarly, fluid under pressure is conducted from the third and fourth fluid supply conduits 32B, 32C (FIG. 1), via the third and fourth, fluid receiving conduits 220B, 220C, respectively, to portions of the first chamber 192 respectively communicating with the first and second piston faces 206, 207 of the first plunger 194. The spring rates of springs 182, 183 are selected to permit compression of both springs by the force exerted upon any one of the piston faces 206, 207, 213, and 214 by the fluid pressures available at the respective, associated fluid supply conduits 32B, 32C, 32A, and 32 (FIG. 1) during normal operation of the respective fluid amplifiers 21B, 21C, 21A, and 21. That is, the elongated valving members 171, 172 are restrained in their retracted positions by a normal fluid pressure acting upon at least one of the piston faces 206, 207, 213, 214, and the valving system 170 is thus operative to permit unrestricted flow of fluid to the actuator 11 through conduits 94, 95, 100, and 101, via annular grooves 230, 231, 232, and 233 so long as pressure is received at any one of the valving member piston faces 206, 207, 213, 214. Thus, unrestricted communication is permitted between the flow control valve 53 and the actuator 11 as long as supply fluid is present at any one of the fluid amplifiers 21; i.e., as long as any one of the monitor valves 33 remains open to permit fluid flow to the respective, associated, fluid amplifier. As will be discussed in a later section, the valving system 170 has utility, in combination with the servo control system 26, apart from the fail-safe linkage system 58. The valving system 170 is, however, particularly adapted for use in combination with the linkage system 170, as will be understood from the description to follow.

With reference now to FIG. 7, the fail-safe linkage system 58 will now be described. The system housing 26 and the actuator 11 are bolted together, or connected by other suitable means, and are each connected to portions of the fail-safe linkage system 58. In FIG. 7, the housing 26 and actuator 11 are shown in the same scale, in contrast to the diagrammatic representation of FIGS. 1–4 wherein components illustrated in FIGS. 1–3 are enlarged, for clarity, relative to the actuator 11 of FIG. 4.

According to practices generally known in the art, the lug 15 of the actuator piston rod 14 suitably is pivotally connected to a driving arm 240 which extends generally perpendicularly from the piston rod 14 toward the load, which, in the present example, comprises an airfoil 241, such as a horizontal stabilizer, rotatable about an axis extending spanwise and shown diagrammatically in cross-section in FIG. 7. The lug 15 and arm 240 are suitably pivotally connected by an axle or pin 242 extending between spaced clevis segments of the lug 15 and rotatably supporting the arm 240 between the clevis segments. The stabilizer 241 may be of the type pivotally supported upon an axle 243 rotatably journalled within a bearing assembly 244 which is seated upon an axle 243 rotatably journalled within a bearing assembly 244 which is seated within structure 245 rigidly affixed to the frmae of the aircraft as indicated diagrammatically at 246. Thus, the actuator 11 is operable, by generally linear movement of the piston rod 14, to cause rotational movement of the stabilizer 241 within bearing assembly 244, the axes of axles 243 and 242 extending generally parallel to the major plane of the stabilizer 241. The external housing 249 of the actuator 11 is affixed to the aircraft frame by any suitable means permitting freedom of rotation of the actuator housing 249 in a vertical plane, and is preferably connected by a trunion assembly 250 having a vertical clevis grounded to the aircraft frame as indicated at 251 and connected to a lug 252 formed on the left end of the actuator housing 249 for permitting pivotal or orbital movement of the actuator housing 249 upon the trunion 250.

The linkage elements of the fail-safe linkage system 58 will now be described. For convenience and clarity of description, the actuator 11 and piston rod 14, which extend from the trunion 250 in the first direction toward the lug 15, will be described as extending horizontally, from left to right as they are shown in the drawing, the control system housing 26 being considered as positioned directly above the actuator 11 and the driving arm 240 extending upwardly and in a vertical plane. These positional terms (e.g., leftwardly, rightwardly, upwardly, downwardly) should not, of course, be considered as limiting the system to any particular orientation but are rather for illustrative and descriptive purposes only. It will be initially noted that, in the present embodiment, the movable elements of the linkage system 58 are pivotable upon respective horizontal axes which are all parallel to the rotational axes of the pin 242 and the stabilizer axle 243 just described, and also parallel to the rotational axes of the rocker arms 46, 47, 186 (FIGS. 1 and 3) within the housing 26. The pivotal structures now to be described, e.g., the arm 273, idler arm 280, cam member 292, and crank 303 (all to be described), are pivotable about respective axes extending parallel to the pin 242 and axle 243, and the respective end portions of the movable, pivotal elements comprise clevis and bearing connections, to be described, in which the clevis slots are parallel to a plane extending perpendicularly of the pivotal axes.

An elongated linkage rod 253 is pivotally connected to the driving arm 240, at a location thereon spaced between the stabilizer 241 and the lug 15, suitably by means of a lug 254 formed on the end of the rod 253 adjacent the arm 240, which lug 254 rides within a corresponding slot 255 extending within the arm 240, the lug 24 suitably being rotatable about a pin 256 extending through the lug 254 and connected to the arm 240. At the opposite end of the linkage rod 253, another lug 257 is provided which is rotatably engaged between the vertical leaves of a clevis 260 formed on the upper end of a walking beam structure 262, to be described, and rotatable about a pin 261 extending between the leaves of the clevis 260. The pins 256 and 261 are journalled within suitable bearing assemblies, not shown, seated within the lugs 254 and 257, respectively, for minimizing frictional resistance to pivotal movement of the elongated linkage rod 253 relative to the driving arm 240 and the walking beam structure 262 and for minimizing non-pivotal relative movement, or slop, between the connected elements, according to practices well-known in the art. (Similar bearings, not shown, are correspondingly employed in the end portions or lugs of the remaining pivotal links and arms, to be described, of the linkage system 58, according to practices well-known in the art, for ensuring that the feedback signals transmitted by the linkage system 58 are not distorted by non-pivotable relative movement between the linkage elements.)

With added reference to FIG. 11, a horizontally extending torque tube 263 is affixed to the walking beam structure 262 (in a manner to be more fully described below) at a location spaced from the end portions of the walking beam. The walking beam structure 262 has a first portion 262A welded to and extending generally upwardly from the center of the torque tube 263 to the lug 260, and a second portion 262B extending in the opposite direction from the torque tube 263. A two-member arm structure 264 comprises first and second parallel arms 264A, 264B extending from and fixedly connected to the torque tube 264 on opposite sides of the walking beam first portion 262A. The distal ends of the arms 264A and 264B are positioned on opposite sides of a raised portion 265 of the actuator housing 249 adjacent the upper, right end portion of the housing 249. A bolt 266 extends through the raised housing portion 265 and through respective bearings, not shown, seated in the distal end portions of the arms 264A and 264B for pivotally supporting the arms and the walking beam structure 262 from the actuator housing 249, permitting pivotal movement of the walking beam structure 262 in a vertical plane. The lower, second portion 262B of the walking beam structure 262 is approximately U-shaped in plan, having legs, whose ends are welded or otherwise affixed to opposite end portions of the torque tube 264, which extend downwardly from the torque tube on opposite sides of the actuator housing 249 and which are connected by a curved, approximately semicircular lower portion 267 extending below the actuator housing 249 and spaced sufficiently from the housing 249 to permit a desired degree of pivotal movement of the walking beam structure 262, as will be understood more fully from the description hereinbelow of the operation of the linkage system 58. The curved portion 262, at its lowermost portion, is welded to a link member 268 (FIG. 7) which extends leftwardly and downwardly from its connection to the walking beam structure 262. The distal end portion of the link member 268 is vertically clevised for receiving a lug 270, which is, in turn, attached to the distal ends of the connecting rods 17 of the position sensor system 16. A bolt 271 extends horizontally through the distal end portion of link member 268 and is rotatably journalled within lug 270 for permitting approximately horizontal and linear movement of the connecting rods 17 in response to pivotal movement of the walking beam structure 262. A vertically clevised base portion 272 of the outer housing of position sensor system 16 is pivotally connected to the actuator housing 249 for permitting pivotal movement of the sensor system 16 about a horizontal axis for permitting the connecting rods 17 to directly follow the pivotal movement of walking beam structure 262. The position sensor system 16 also includes a horizontally extending, tension spring, not shown, continuously urging the connecting rods 17 and lug 270 to the left, thus tending to apply a clockwise torque to the walking beam structure 262 for imparting a load to all the movable elements of the linkage system just described, thus further reducing any non-pivot relative movement of the movable elements.

When the actuator piston 14 is approximately centered within its range of movement, the walking beam structure 262 is positioned in a medial pivotal position, as viewed in FIG. 7, wherein it extends upwardly and somewhat rightwardly from its connection to link member 268. The arms 264A, 264B of the two-member arm structure 264 then extend leftwardly and downwardly from the torque tube 263. The arm structure 264, permitting pivotal movement of the walking beam structure 262 about the axis through bolt 266, is employed for convenience in centering the longitudinal axes of the connecting rods 17 and of the elongated linkage rod 253 within their respective ranges of pivotal movement relative to walking beam structure 262, according to practices well known in the art, and may therefore be unnecessary in other embodiments of the system wherein, for example, the walking beam structure is pivotal about the longitudinal axis of its torque tube 263.

Another, upper arm 273 is affixed to the walking beam structure 262 at a portion thereof aligned with the torque tube 263, suitably by being welded to the walking beam structure lower portion 262B adjacent its connection with the torque tube 263. When the walking beam structure 262 is in its medial position, the upper arm 273 extends leftwardly and upwardly from the torque tube 263.

The distal end portion of the upper arm 273 is slotted vertically to define a clevis for pivotally receiving a first lug 274 of a drag link structure 275, the drag link structure extending generally horizontally and leftwardly from its connection to the upper arm 273. The drag link structure 275 also includes, at its opposite end portion, a vertically oriented, second lug 276 attached to an externally threaded rod portion 277 which is threadingly engaged within the first lug 274 for permitting an adjustment of the spacing between the two lugs 274, 276 for facilitating alignment and adjustment of the linkage system 58, as will be more fully understood from the description to follow. The second lug 276 is pivotally received within a clevis formed within the lower end portion of a linkage member 280, termed hereinafter the idler crank 280. As previously suggested, each of the pivotal connections of the movable portions of the linkage system 58, such as the connections between lugs 276, 274 and their associated clevises, incorporate respective bearing assemblies, not shown, seated within the lugs and employed to rotatably journal corresponding bolts or pins extending through the associated clevises, in the well-known manner, for reducing friction and slop between the movable linkage elements.

The idler crank 280 comprises a link extending generally vertically when the piston rod 14 is at least approximately centered within its range of movement as in FIG. 7, and having a rightwardly deviated midportion 281. With additional reference to FIG. 6, the idler crank 280 is rotatably supported upon a bolt 282 which extends horizontally, toward the first housing segment 28, within a supportive, planar crank member 283 parallel to and extending between the bolt 282 and the horizontal axle 54 supporting the second rocker arm 47 and extending outwardly from the housing segment 28. The planar crank member 283 has a major, central plane which bisects the bolt 282 extending through the upper portion of the crank, and the axle 54, which extends through a lower portion of the crank 283. The axle 54 is splined non-rotatably to the crank 283, suitably by a woodruff key 284 extending within the crank 283 and extending radially within the axle 54. An external bearing assembly 285 is provided for rotatably supporting the axle 54 at a portion thereof extending beyond the crank 283, the bearing 285 being seated within structure, not shown, suitably grounded to the housing segment 28. The bolt 282 extending through the upper portion of the crank 283 is rotatably journalled within a bearing assembly 286 seated within the upper end portion of the idler crank 280.

A cylindrical cam follower 290 is rotatably mounted upon a bolt 291 extending horizontally through the idler crank 280 and projecting from the outboard side of the idler crank 280 relative to the housing segment 28. The cam supporting bolt 291 is positioned between the deviated midportion 281 of the idler crank 280 and the supportive bolt 282, and bearing 286 but is spaced from the bolt 282 by a distance less than the spacing between the bolt 282 and the axle 54.

Figure 12:
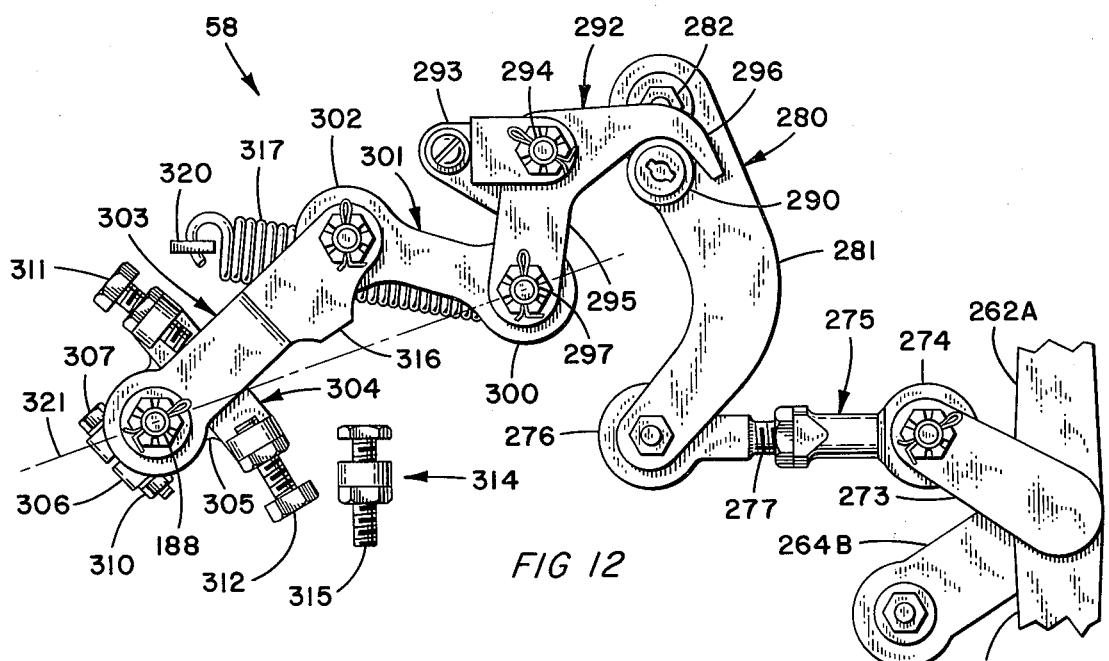
FIG. 12 is a plan view of elements of the fail-safe linkage system in a cam-released position.
Figure 11:
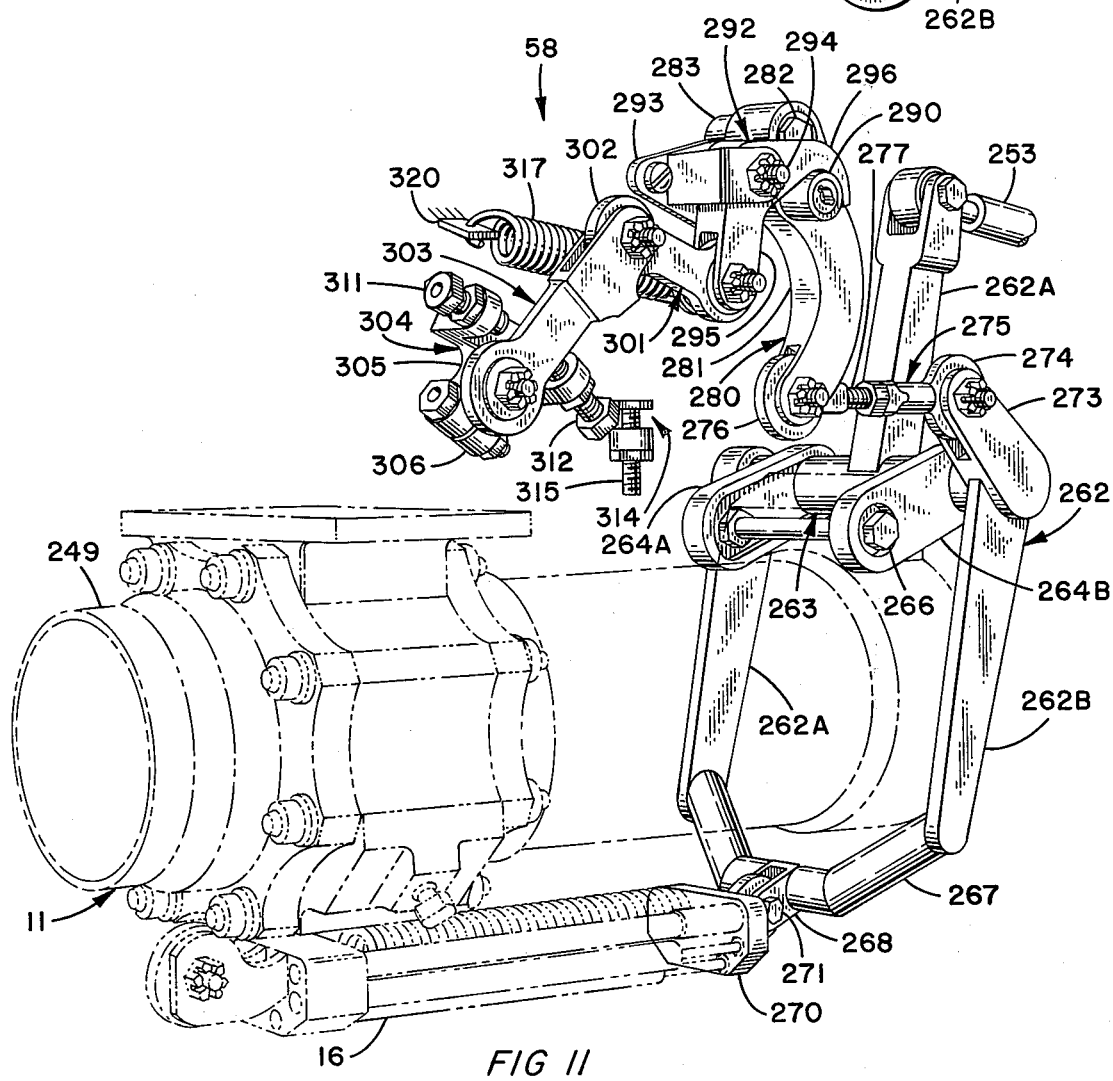
FIG. 11 is a perspective view of the fail-safe, position feedback linkage system of FIG. 7.

Referring to FIGS. 12 and 7, a generally hook-shaped cam member 292 is pivotally supported within a clevis formed vertically, and open to the right, in a support member 293 bolted to the housing segment 28 (FIG. 7), adjacent and spaced to the left of the cam follower 290, the cam member 292 having a bearing, not shown, journalling a horizontal bolt 294 through the clevis of support member 293 and permitting pivotal movement of the cam member about the bolt 294 between a disengaged position, shown in FIG. 7, and a cam engaged position, shown in FIGS. 11 and 12. As shown most clearly in FIG. 12, the cam member 292 has a first leg 295 which extends downwardly and leftwardly from the pivot axis when the cam follower 290 is engaged, and downwardly and rightwardly during the disengaged position of the cam 280. A second arm 296 of the cam member 295 extends generally upwardly and rightwardly from the first portion 295 in arcuate, hook-like fashion over the cam follower 290, having a concave, lower cam surface adapted to engage the cam follower 290 when the cam member 292 is rotated in a clockwise direction into the cam engaged position (of FIG. 12) for then preventing sideward movement of the cam follower 290 relative to the cam 292. The lower, distal end portion of the cam member first arm 295 has an upwardly extending clevis through which a horizontal bolt 297 is perpendicularly extended, the clevis pivotally receiving a lug 300 (FIG. 12) having a bearing in which the bolt 297 is journalled, the lug 300 being defined by an end portion of a drag link 301 and denoted hereinafter the first lug 300 of the drag link 301, the drag link 301 extending leftwardly from the cam member first arm 295 and having an opposite end portion defining a second lug 302 which is, in turn, pivotally mounted within a clevised, distal end portion of a crank member 303. The opposite (proximate) end portion of the crank 303 is pivotally mounted upon the axle 188, previously described, which extends outwardly from the housing 26 and is splined non-rotatably to the third rocker arm 186 (FIG. 3) of the valving system 170.

With reference to FIG. 11, a rotatable frame member 304 is affixed to the axle 188 at a location thereon between the housing 26 and the crank member 303. The frame member 304 suitably includes a planar body portion 305 which extends in a vertical plane from the axle 188 generally toward the second link 301. A bifurcated base portion 306 of the frame 304 has dual arms extending from the body portion 305 and extending on opposite sides of the axle 188, and a locking bolt 307 extends through corresponding bores formed through the two arms of the base portion 305, substantially tangentially of the axle 188. The locking bolt 307 is engaged by a corresponding nut 310 on one side of the bifurcated base portion 306 of frame member 304 whereby the arms of the base portion 306 are brought into firm contact with the axle 188 and whereby the frame member 304 may be securely fastened non-rotatably to the axle 188. An additional woodruff key, not shown, is suitably employed, projecting within the axle 188 and the frame member 304, for ensuring a non-rotatable mounting of the frame member 304 upon the axle 188. The frame member 304 additionally has first and second adjusting screws 311 and 312 threadingly engaged with portions of the frame member 304 extending outwardly with respect to housing segment 28 (FIG. 7) and positioned alongside, and respectively on opposite sides, of the crank member 303, the adjusting screws 311, 312 extending toward the crank member 303 from opposite sides for permitting a degree of rotational movement of the frame member 304 independently of the crank member 303. A stop member 314 having an adjustable stop screw 315 threadingly extending therethrough toward the crank 303 is mounted on the housing segment 28 and positioned below and in alignment with the crank member 303, the crank 303 having a downwardly projecting side portion 316 positioned to contact the stop member screw 315 when the crank member 303 is rotated in a clockwise direction into contact with stop screw 315 (FIG. 7).

A coil spring 317 is provided having one end attached to a tab member 320 affixed to the housing 26 and at a portion thereof spaced above the axle 188 and another end attached to the drag link 301 from a portion thereof adjacent its first lug portion 300, the spring 317 extending, under tension, generally leftwardly and upwardly from the lug 300 whereby the cam 292 is urged in a clockwise rotational direction. The stop screw 315 is adjusted to contact the crank member projecting portion 316 when the crank member 303 is rotated in a clockwise direction until stopped by the stop screw 315 whereupon the crank member 303 and drag link 301 are approximately longitudinally aligned upon an axis 321 bisecting the axle 188 and the bolt 297 about which the drag link 301 pivots with respect to the cam member 292 and whereupon the drag link 301 and the crank 303 extend along axes inclined somewhat downwardly from the central axis 321.

It will now be understood by those in the art that the crank 303, drag link 301, stop member 314, and spring 317 comprise a toggle linkage adapted to remain locked in the cam-released position of FIG. 7 by the spring 397, which urges the connected ends of crank 303 and drag link 301 downwardly against the stop screw 315, whereupon the first arm 295 of the cam member 292 is maintained rightwardly of a vertical axis through the bolt 294 and wherein the cam 292 is released from cam follower 290. Upon the crank 303 then being rotated in a counterclockwise rotational direction upon the axle 188, the cam member first arm 295 is translated to the left, rotating the cam member 292 in a clockwise direction until the cam follower 290 is engaged by the cam surface of the cam second arm 296, and whereupon the drag link 301 extends at an angle inclined upwardly with respect to the axis 321, the spring 317 also extending from bolt 297 along an axis inclined upwardly with respect to the central axis 321, whereby the cam member 292 is continuously urged in a clockwise rotational direction.

With primary reference to FIG. 3, the operation of the fail-safe valving system 170 will now be described. The valving system 170 will be initially described without reference to the linkage system 58, i.e., in an application wherein the fail-safe linkage system 58 is omitted (not shown), whereby axle 188 connected to the third rocker arm 186 is free to rotate and is not connected to the crank 303, wherein the remaining elements of the fail-safe linkage system (including the walking beam structure 262, drag link structure 275, and elonated linkage rod 253) are omitted and whereby the position sensor system 16 has its movable connecting rods 17 connected directly to the actuator piston rod lug 15 (as shown in FIG. 4 and described initially with respect to the electromechanical, position feedback arrangement of the servo system 26) rather than to the walking beam structure 262 as shown in FIG. 7. Such an arrangement has utility in applications wherein there is no need to actively move the movable load structure 241 to a particular, predetermined position within its range of movement in the event of a failure of the electrical portions of the servo control system 26, but wherein it is desired to dampen any movement of the load structure subsequent to such a failure.

More specifically, assume that the servo control system 26 is employed to position an aircraft rudder. While the load 241 has been illustrated as a horizontal stabilizer, for purposes of the description to follow of the valving system 170, reference to the load 241, in the immediately following paragraphs, will be to a rudder (241). As has been previously suggested, the springs 182, 183 of the fail-safe valving system 170 (FIG. 3) have respective spring rates chosen to permit the valving members 171, 172 to be restrained in their retracted positions by fluid pressure (received from any one of the supply conduits 32, 32A, 32B, and 32C respectively and discretely communicating with the fluid amplifiers 21, 21A, 21B, and 21C) acting upon any one of the piston faces 206, 207, 213, or 214, whereupon the valving members 171, 172, maintained in their fully retracted positions as shown in FIG. 3, permit substantially unrestricted fluid communication between the flow control valve 53 and the actuator 11 through the annular grooves 230, 231, 232, and 233 then positioned in register with the conduits 94, 95, 100, and 101. Assume now that a failure of the control system 26 occurs wherein electrical malfunctions occur causing failure of all the fluid amplifiers 21, 21A, 21B, and 21C whereby all the monitor valves 33, 33A, 33B, and 33C are actuated to shut off the supply flow to each of the fluid amplifiers and wherein the pressure of any supply flow to the flow control valve 53 is reduced, e.g., by a pressure reducing valve, not shown, actuated upon failure of the fluid amplifiers, and connected to reduce pressure within the fluid supplies 29, 30. (Alternatively, such reduced pressure within the fluid supplies 29, 30 could result, in military use, when enemy fire resulted in damage to and leakage of fluid from, the fluid supplies whereby their pressure levels are reduced). The springs 182, 183 of the valving system 170 then are unopposed by fluid pressures acting upon the plunger member piston face areas 206, 207, 213, 214, and are thus free to move the elongated valving members 171, 172 to their partially projecting, medial positions, previously described, in which the restrictive orifices 234, 235, 236 and 237 are in register with the conduits 94, 95, 100, and 101, respectively, thus causing the third rocker arm 186 to rotate in a counterclockwise rotational direction and causing the plunger members 194, 211, to be moved into contact with the stop members 201, 212. Fluid which is ejected from the elongated chambers 192, 210 by this inward movement of the plunger members 194, 211 passes through the fluid receiving conduits 220, 220A, 220B, and 220C, the fluid supply conduits 32, 32A, 32B, and 32C (FIG. 1), respectively, and then through the fluid amplifier fluid inlets 34 to the fluid amplifiers 21, 21A, 21B, and 21C, from which drainage is permitted through the drainage passageways 69, 70. While the valving members 171, 172 are maintained in this medial position, the restrictive orifices 234, 235, 236, and 237 thus permit restricted communication between the flow control valve 53 and the actuator 11, which prevents sudden or rapid, uncontrolled movement of the actuator pistons 12, 13 (FIG. 4) and of the movable load structure 241.

Absent the valving system 170 connected between the flow control valve 53 and the actuator 11, there would be no assurance that such uncontrolled movement would not occur. That is, at the moment of failure of the fluid amplifiers 21, 21A, 21B, and 21C, it is improbable that the flow control valve element 52 will be precisely centered in the "null" position, shown in FIG. 3, wherein the valve outlets (e.g., 92, 93) communicating with the fluid conduits 94, 95, 100, and 101 are closed by the valve member lands (e.g., the first and second lands 98, 99). Thus, the lands (e.g., 98, 99) will in all probability be positioned at least slightly out of register with the corresponding valve outlets, whereupon fluid flow is permitted through the flow control valve 53 to or from the drainage outlets 71, 72 and the sources of fluid under (not reduced) pressure 29, 30, whereupon there is no substantial resistance to movement of the actuator pistons 12, 13 caused by restriction of fluid flow between the actuator 11 and the flow control valve 53. With the valving members 171, 172 positioned in their medial positions as described above, however, any fluid flow between the flow control valve 53 and the actuator 11 is restricted, whereby any subsequent movement of the actuator piston rod 14 and the load structure 241 is damped, and whereby sudden, rapid movement of the load structure is prevented. When the actuator 11 is drivingly connected to a load structure 241, such as a rudder, which tends to move to an acceptable or safe portion of its positional range during normal operation (e.g., to an approximately centered position), the valving system 170, when in its medial positional mode, permits restricted or dampened movement of the load to its acceptable range while preventing violent, uncontrolled movement of the load in either direction. As will be understood by those in the art, the size of the restrictive orifices 234, 235, 236, and 237 may be adjusted to permit a desired degree of restriction of fluid flow, and thus, a desired degree of damping of load structure movement, appropriate to any of a variety of applications.

Further counterclockwise movement of the third rocker arm 186 and further resultant, outward movement of the plunger members 194, 211 is normally prevented by the stop members 201 and 212 because of fluid pressures acting upon the outwardly facing piston face areas defined by the stop member head portions 202, 216, respectively. That is, fluid under pressure is normally received within the third portion 192C of the first elongated chamber 192 via the inlet passageway 225 which has communication with the second source 30 of fluid under pressure via outlet orifice 228 of the flow control valve 53. Similarly, fluid under pressure received from the first fluid source 29 is normally conducted to the outboard piston face of the second stop member 212 through the first inlet passageway 222. The stop member head portions 202, 216 are of sufficient area, relative to the pressures received, to prevent movement of the stop members 201, 212 from their projected positions, shown in FIG. 3 and described previously with respect to the medial position of the valving members 171, 172, by the action of springs 182, 183 so long as fluid under pressure is applied against either the first stop member 201 from the second fluid source 30 or against the second stop member 212 from the first fluid source 29. Upon the occurrence of a total failure of both fluid sources 29, 30, wherein all supply fluid pressure is lost, however, pressure induced forces opposing movement of the stop members 201, 212 are lost, whereupon the compressed springs 182, 183 act to move the valving members 171, 172 to their fully projected positions in which the third rocker arm 186 is rotated to its extreme counterclockwise position and wherein the stop members 201, 212 are translated outwardly, by outward movement of the plunger members 194, 211, until the stop members 201, 212 abut the chamber transverse end walls 205, 217. In this fully projected position, non-grooved portions of the valving members 171, 172 respectively extending outwardly (relative to the third rocker arm 186) from the first, second, third, and fourth restrictive orifices 234, 235, 236, 237 are in register with the conduits 94, 95, 100, and 101, respectively, and serve to prevent any further substantial fluid flow between the flow control valve 53 and the actuator 11, thus locking the actuator piston rod 14 and the load 241 in their current positions. This locking function is of utility in applications wherein any movement of the load 241 subsequent to a total failure of the fluid supply system 29, 30, whereby no fluid under pressure is supplied to the flow control valve 53, is undesirable or dangerous.

It thus can be understood that the valving member 171, 172, along with the rocker arm 186, comprise a valving structure movable between a first position, in hwich the valving members 171, 172 are retracted within the chambers 171', 172' as seen in FIG. 3, a second (medial) position, and a third, fully projected postiion, as described above. The annular grooves 230, 231, 232, 233 comprise porting means permitting substantially unrestricted fluid flow between the flow control valve 53 and the actuator 11 when the valving structure is in its first position, and the restrictive orifices 234, 235, 236, and 237 comprise orificial means permitting restricted fluid flow between the flow control valve and the actuator upon the valving structure (171, 172, 186) being in its second position. Upon the valving structure being in the third position, wherein the valving members 171, 172 are in their fully projected positions, the non-grooved portions of the valving members which block the conduits 94, 95, 100, 101 thus comprise valving means preventing any substantial fluid flow between the flow control valve 53 and the actuator 11 and preventing any substantial subsequent movement of the movable load structure 241. The plunger members 194, 211, with their associated, stepped, enclosing chambers, comprise pressure responsive means, having fluid communication with the fluid amplifiers 21, 21A, 21B, 21C, urging the valving structure (171, 172, 186) toward its first position and constraining it therein so long as fluid pressure is received through conduits 220, 220A, 220B, or 220C from any one of the fluid supply conduits 32, 32A, 32B, or 32C, i.e., so long as any one of the fluid amplifiers 21, 21A, 21B, 21C is operative, or has not been shut off by an interruption of its supply flow by the respective, associated monitor valve 33, 33A, 33B, or 33C. The springs 182, 183 comprise means urging the valving structure (171, 172, 186) toward its third position and operable to move the valving structure to its second position when the plunger members 194, 211 do not receive fluid pressure from any of the supply conduits 32, 32A, 32B, or 32C. The stop members 201, 212 comprise means normally preventing movement of the valving structure from its second to its third position but permitting movement of the valving structure to its third position upon the occurrence of a loss of fluid pressure upstream of the flow control valve 53 (resulting in a loss of pressure downstream thereof at fluid passageways 222 and 225). The restrictive orifices 234, 235, 236, and 237, in combination with the plunger members 194, 211, the stop members 201 and 212, and the springs 182, 183, comprise means restricting any fluid flow between the flow control valve 53 and the actuator 11 upon the occurrence of a loss of supply flow to each fluid amplifier but permitting a degree of fluid flow permitting dampened movement of the movable structure.

The servo control system 26 may be termed a fluid powered control system of a type having a first portion (e.g., constituting the initial amplification stage provided by the fluid amplifiers 21, 21A, 21B, and 21C); a second portion (comprising the flow control valve 53) to which the first portion is operatively connected by means of the movable summing structure 37 and the first and second rocker arms 46 and 47; and a third portion, constituting the actuator 11, with which the second (flow control valve) portion is fluidly and operatively connected. The fail-safe valving system 170 is thus fluidly connected in series between the second and third, control system portions.

While a preferred embodiment of the fail-safe valving system 170 has been described with reference to its application in a particular control system 26, it will be understood that various modifications of the valving system from the specifically described embodiment may be made as required for other applications. For example, in a less sophisticated servo control system, not shown, employing an actuator having only one piston rather than the duplex piston arrangement 12, 13 of the illustrated actuator 11, a flow control valve having only components corresponding to the flow control valve portions extending within one of the housing segments 27, 28 would be employed, and the flow control valve would thus have only one fluid outlet, e.g., corresponding to the outlet 92, and one fluid return or inlet port corresponding to inlet port 93. In such a simplified control system, there remains no need for fluid isolation of the portions of the valving system 170 respectively mounted within the first and second housing segments 27 and 28. Thus, a simplified embodiment of the valving system, not shown, suitable for such a control system incorporates a single movable valving element, such as the first valving member 171, fixedly connected to or continuous with a stepped plunger member such as the first plunger member 194 (the rocker arm being omitted unless necessary for transmission of positional signals to a position feedback linkage system, as will be described hereinafter). A single stop member such as the first stop member 201 is fluidly connected to the single flow control valve segment, and a single compressed spring (or its functional equivalent) such as the first spring 182 urges the combined movable element toward the stop member.

It will also be understood by those in the art that the plunger members, e.g., member 194, which are illustrated as having two piston faces (206, 207) are suitably alternatively provided with only one piston face, e.g., for a control system having only one fluid amplifier in its first portion; or alternatively then may be provided with a plurality of piston faces greater than two by employing additional, radially extending piston faces or steps on the plunger members and employing an enclosing chamber having a corresponding plurality of stepped, fluidly discrete chamber portions, not shown. Moreover, while the valving members 171, 172 have each been described and shown having two annular ports 230, 231 and 232, 233 and two restrictive orifices 234, 235 and 236, 237, an alternative valving member, not shown, employs only one port and one orifice and has utility in systems in which it is necessary or desirable to control the flow through only one fluid passageway between the second and third portions of a fluid system. Thus, the fail-safe valving system of the present invention may be broadly defined as having means, such as a valving structure having a restrictive orifice and a non-restrictive port, urged in one direction by means such as the compressed spring 182 (but stopped in a medial position by means such as stop member 201), restricting fluid flow between the second and third portions of a fluid powered system upon the occurrence of a loss of supply flow to a first portion of the fluid powered system, and means preventing fluid flow between the fluid system second and third portions upon the occurrence of a loss of supply flow to the fluid system second portion.

In applications wherein it is necessary to translate the load to a preselected, relatively precise position within its range of movement upon the occurrence of a failure of the fluid amplifiers 21, 21A, 21B, and 21C, the valving system 170 is of particular utility in combination with the position feedback linkage system 58. Assuming now that the servo system 26 is drivingly connected to a load 241 which comprises a pivotable horizontal stablizer, the operation of the linkage system 58 will now be described, with additional reference to FIGS. 7, 11, and 12. In this application, assume also that fluid under pressure continues to flow to the flow control valve 53 in the event of failure of the fluid amplifiers 21, 21A, 21B, and 21C. The toggle linkage, consisting of the rotatable frame member 304, the crank 303, the drag link 301, the spring 317, and the stop member 314, is of a known type and is operable, according to principles known in the art, to lock the cam member 292 in its released position, shown in FIG. 7, upon the crank member being rotated in a clockwise direction, or toward the stop member 314, until the crank 303 is locked against the stop member 314 by the tensional force exerted by the spring 317. Upon the frame member 304 being then rotated in a counterclockwise direction, the seond adjusting screw 312 (FIG. 12) strikes the crank 303 and urges it in a counterclockwise rotational direction. Upon the longitudinal, central axis of the crank 303 passing upwardly across the axis 321, the spring 317 is operable to rotate the cam member 292 in a clockwise rotational direction into engagement with the cam follower 290 (FIGS. 11 and 12), whereupon the cam follower 290 is maintained in centered alignment within the cam second arm 296, and is thus constrained in a fixed position. The crank 303 is rotationally aligned upon the third rocker arm 186 relative to the axle 188 in such a manner that upon the valving structure (186, 171, 172) being in its first position as shown in FIG. 3, the crank 303 is in its locked position (FIG. 7) in which the cam member 292 is disengaged. The second adjusting screw 312 is adjusted sufficiently upwardly, i.e., toward the crank 303, to move the crank 303 from its locked position and across the axis 321 (whereupon the spring 317 operates to move the cam member 292 into its engaged position) upon the occurrence of counterclockwise rotation of the axle 188 and the rocker arm 186 into the medial, second position previously described, or alternatively into the third position.

With respect to the operation of the walking beam 262, the drag link structure 275, and the idler crank 280, it will now be understood that when the cam member 292 is disengaged, the idler crank 280 is free to rotate about its upper bearing 286 (FIG. 6) during axial movement of the drag link 275 without causing any rotation of the planar crank member 283 (FIG. 6) or the axle 54 supporting the second rocker arm 47. Such rotational movement of the idler crank 280 is caused by pivotal movement of the walking beam structure 262 upon bearings, not shown, journalling the bolt 266. Similarly, rotation of the second rocker arm axle 54 and the planar crank member 283 caused by rotation of the second rocker arm 47 during normal operation of the servo control system 26 is freely permitted by the pivotal connection of the idler crank 280 to the second lug 276 of the drag link structure 275. Upon the cam member 292 being in its engaged position (FIG. 12), however, the cam follower 290 is constrained in a fixed position and the idler crank 280 is caused to rotate about the central axis of the cam follower 290 when the idler crank 280 is caused to rotate by axial movement of the drag link structure 275. As seen most clearly in FIG. 6, such rotation of the idler crank 280 about the horizontal, central axis of the cam follower 290 produces rotation of the planar crank member 283 and the axle 54 within the external bearing 285 and within the first and second bearing structures 49A, 49B which rotatably support the second rocker arm 47. This rotational movement of the second rocker arm axle 54 causes corresponding rotational movement of the second rocker arm 47, splined to the axle 54 and with additional reference to FIGS. 1 and 3, causes axial movement of the movable summing structure 37 and of the valve element 52 of the flow control valve 53.

The drag link structure 275, in use, is adjusted to a length which, upon the (horizontal) stabilizer 241 being in a desired, preselected position within its range of movement and upon the cam member 292 being in its engaged position (FIG. 12), results in the second rocker arm 47 being oriented in a position which axially aligns the valve element 52 of the flow control valve 53 in its null position (FIG. 3), in which no fluid flow is transmitted to the actuator 11. Assume now that the horizontal stablizer 241 is rotated in a counterclockwise direction, as viewed in FIG. 7, to an upwardly inclined position and that the cam 292 is disengaged. This counterclockwise rotation of the load 241 and the driving arm 240 induces a clockwise rotation of the walking beam structure 262, translating the drag link structure 275 to the right and causing rotation of the idler crank 280 in a counterclockwise direction upon its upper bearing 286 (FIG. 6). Assume now that a failure of the servo system occurs in which fluid flow to each of the fluid amplifiers 21, 21A, 21B and 21C is shut off by the monitor valves 33, 33A, 33B, and 33C. Such a failure causes the valving structure (186, 171, 172) of the fail-safe valving system 170 to move to its second position, as has been previously explained, whereupon counterclockwise rotation of the crank 303 (FIG. 12) brings the cam element 292 into contact with the cam follower 290. Because of the previous counterclockwise rotation of the idler crank 280, the cam follower 290 is now positioned somewhat rightwardly of the horizontal center of the concave cam surface of the cam member 292; thus, as the toggle linkage spring 317 urges the cam member 292 into its fully engaged position, the cam follower 290 will be translated leftwardly by the cam 292, i.e., rotated in a counterclockwise direction upon the lug 276 of the drag link structure 275, whereupon the planar crank member 283 (FIG. 6) and the second rocker arm 47 (FIG. 1) are rotated in a counterclockwise direction. This action translates the valving element 52 of the flow control valve 53 (FIG. 3) rightwardly from its null position, and fluid under pressure is thereby caused to flow to the actuator 11 causing it to rotate the driving arm 240 and the load 241 in a clockwise direction. More specifically, fluid under pressure is caused to flow from the first pressure source 29 successively through the valve second outlet 93, the conduit portion 95A, the second restrictive orifice 235 of the first valving member 171, and the conduit portion 95B, to the chamber portion of the actuator 11 immediately to the right of the first piston 12 (and, correspondingly, from the second fluid source 30 to the second actuator piston 13), thus operating the actuator 11 to translate the driving arm 240 and the load 241 in a clockwise rotational direction. When the load 241 then reaches its preselected position, the valving element 52 of the flow control valve 53 is positioned in its null position by the linkage rod 253, the walking beam structure 262, idler crank 280, and the planar crank member 283, as has been described, whereupon the actuator 11 constrains the load 241 in the preselected position.

It will be recognized by those in the art that apart from the action of the fail-safe valving system 170 in restricting fluid flow between the actuator 11 and the flow control valve 53 upon the occurrence of a failure of the fluid amplifiers, any feedback system (not shown) which would operate the actuator 11 to move the load 241 could tend to move the load 241 in a violent and possibly hazardous manner, since the flow control valve 53 would be maintained in a "wide open" operative condition until the preselected position was reached. (In normal operation, the closedloop feedback system of the servo control system 26 provided by the position sensor system 16, the differential signal amplifiers 19, 19A, 19B, 19C, and the fluid amplifiers 21, 21A, 21B, and 21C prevent such violent operation of the actuator 11).

Thus, the fail-safe valving system 170 permits safe operation of the position feedback linkage system 58 to operate the flow control valve 53 and the actuator 11 to appropriately position the load apart from the operation of any of the electrical feedback elements of the servo control system 26, providing fail-safe, emergency operation of the actuator 11 even during the occurrence of a complete failure of all the electrical portions of the control system 26.

In the event of a failure of the fluid supply system upstream of the flow control valve 53 whereby the flow control valve 53 can no longer operate the actuator 11, the fail-safe valving system 170 is operative to shut off further fluid flow between the flow control valve 53 and the actuator 11, as has been previously discussed, thus locking the load 241 in its current position.

While only one embodiment of the invention, together with modifications thereof, has been described in detail herein and shown in the accompanying drawing, it will be evident that various further modifications are possible in the arrangement of its components without departing from the scope of the invention.

What is claimed is:

1. A fluid powered servo control system responsive to a plurality of redundant, command input signals and comprising:
   a source of fluid under pressure;
   a plurality of conduits communicating with the source of fluid under pressure;
   a plurality of fluid amplifiers each operative in response to a respective command signal, each having a fluid inlet connected to a respective one of the conduits and first and second fluid outlets, and each comprising means receiving fluid from the source of fluid under pressure and ejecting fluid proportionally through the two outlets in response to a respective command signal to cause a differential pressure output signal across the outlets, the fluid outlets of each fluid amplifier being fluidly isolated from the outlets of the other fluid amplifiers;
   a housing;
   a movable summing structure slideably mounted within the housing and comprising means summing the output signals of the fluid amplifiers, the movable summing structure having a plurality of pairs of piston face areas, each pair being fluidly associated with a respective fluid amplifier, each piston face area comprising means for receiving fluid pressure from a respective one of the fluid amplifier outlets;
   a plurality of differential pressure monitoring means, each monitoring means being connected to a respective one of the conduits in series between the source of fluid under pressure and the corresponding fluid amplifier and comprising a means for shutting off fluid to the respective fluid amplifier upon the occurrence of a differential pressure, between the outlets of the respective fluid amplifier, which exceeds a predetermined level;
   a flow control valve having a movable valve element, the summing structure being operatively connected to the movable valve element, the flow control valve being fluidly connected to, and receiving fluid under pressure from, the source of fluid under pressure;
   a fluid powered actuator drivingly connected to a movable load, the flow control valve being fluidly operatively connected to the actuator;
   a fail-safe valving system fluidly connected in series between the flow control valve and the actuator and comprising means for restricting any fluid flow between the flow control valve and the actuator upon concurrent operation of all the monitoring means shutting off fluid flow to all the fluid amplifiers, and for shutting off fluid flow between the flow control valve and the actuator upon the occurrence of a failure of the source of fluid under pressure whereby fluid under pressure is not supplied to the flow control valve.

2. The apparatus of claim 1, further comprising a position feedback system connected between the movable load and the movable valve element of the flow control valve and comprising means for actuating the flow control valve to operate the actuator to move the load structure to a preselected position within its positional range upon the fail-safe valving system being operative to restrict any fluid flow between the flow control valve and the actuator.

3. For a fluid powered control system of a type having first and second portions, each normally receiving a supply of fluid under pressure, and a third portion, the second portion of the control system being fluidly connected to the third portion, a fail-safe valving system fluidly connected in series between the control system second and third portions and comprising:
   a housing defining at least one chamber;
   a valving structure, comprising at least one valving member slideably seated within the at least one chamber, movable through a range of positions which include first, second, and third sequential positions, the valving structure having valving means preventing fluid flow between the control system second and third portions upon the valving structure being in its third position, having porting means permitting substantially unrestricted fluid flow between the control system second and third portions upon the valving structure being in its first position, and having orificial means permitting restricted fluid flow between the control system second and third portions upon the valving structure being in its second position;
   means urging the valving structure toward its third position;
   pressure responsive means, having fluid communication with the control system first portion, for urging the valving structure toward and constraining the valving structure in its first position while fluid under pressure is supplied to the control system first portion and, alternatively, for permitting movement of the valving structure from its first position by the means urging the valving structure toward its third position upon the supply flow to the control system first portion being shut off;
   means normally preventing movement of the valving structure from its second to its third position and, alternatively, permitting movement of the valving structure to its third position upon the supply flow to the control system second portion being shut off.

4. The apparatus of claim 3, wherein the control system first portion comprises a plurality of fluid amplifiers, each normally receiving a supply of fluid under pressure, and wherein the pressure responsive means comprises means, having discrete fluid communication with each of the fluid amplifiers, for constraining the valving structure in its first position while fluid under pressure is supplied to at least one of the fluid amplifiers and, alternatively, for permitting movement of the valving structure from its first position, by the means urging the valving structure toward its third position, upon the supply flow to each fluid amplifier being shut off.

5. The apparatus of claim 4, the valving structure having a plurality of piston faces each having discrete fluid communication with a respective one of the fluid amplifiers.

6. The apparatus of claim 3, the control system second portion having communication with a source of fluid under pressure, the means normally preventing movement of the valving structure from its second to its third position and, alternatively, permitting movement of the valving structure to its third position upon the supply flow to the control system second portion being shut off comprising a stop member having a piston, having a piston face, slideably mounted within a piston chamber formed in the housing, the piston chamber having communication, at a location therein in communication with the piston face, with the source of fluid under pressure communicating with the control system second portion.

7. The apparatus of claim 3, wherein the control system third portion is a fluid powered actuator, the actuator being drivingly connected to a load structure movable within a range of movement, the control system second portion comprising a flow control valve fluidly operatively connected to the actuator, the apparatus including means translating the load to a preselected position within its positional range upon the valving structure being in its second position.

8. The apparatus of claim 7, the means translating the load to a preselected position comprising position feedback means, connected between the movable load structure and the flow control valve, for actuating the flow control valve to operate the actuator to move the movable load structure to the preselected position, within its positional range, upon the valving structure being moved to its second position, the position feedback means comprising means providing an error signal to the flow control valve until the movable structure is moved to the preselected position.

9. The apparatus of claim 8, linkage means being provided for operatively engaging the position feedback means with the flow control valve upon the valving structure being moved from its first to its second positions and for disengaging the position feedback means upon the valving structure being in its first position.

10. The apparatus of claim 8, the position feedback means constituting a mechanical linkage structure.

11. The apparatus of claim 3, wherein the housing comprises first and second housing segments, the at least one chamber comprising at least two chambers and comprising first and second valving chambers formed respectively in the first and second housing segments, the valving structure comprising first and second valving members resprectively slideably seated in the first and second valving chambers.

12. The apparatus of claim 11, the control system second portion comprising a flow control valve having a portion extending within the first housing segment and another, fluidly discrete portion extending within the second housing segment, the first valving chamber being fluidly connected in series between the flow control valve portion extending within the first housing segment and the control system third portion, and the second valving chamber being fluidly connected in series between the flow control valve portion extending within the second housing segment and the control system third portion.

13. The apparatus of claim 12, the first and second valving chambers comprising elongated, mutually parallel chambers, means, comprising a rocker arm, having first and second end portions, pivotable about an axis perpendicular to a plane through the longitudinal axis of the first and second, mutually parallel valving chambers and equidistant from the longitudinal axes, the first valving member abutting the first end portion of the rocker arm and the second valving member abutting the second end portion of the rocker arm.

14. The apparatus of claim 13, the at least one chamber additionally comprising first and second elongated chambers respectively extending within the second and first housing segments and positioned coaxially of the first and second valving chambers, respectively, the pressure responsive means comprising first and second plunger members slideably mounted within the first and second elongated chambers, respectively, and having respective end portions facing and adapted to butt against the first and second end portions, respectively, of the rocker arm, the first and second plunger members each having at least one piston face directioned outwardly from the rocker arm and having fluid communication with the control system first portion.

15. The apparatus of claim 14, the control system first portion comprising a plurality of fluid amplifiers each having an inlet normally receiving a supply of fluid under pressure, the plunger member piston faces each having discrete fluid communication with the inlet of a respective one of the fluid amplifiers.

16. In combination with a servo control system of the type operable for positioning a movable structure within a range of movement in response to a position command signal, having a flow control valve fluidly operatively connected to an actuator which is drivingly connected to the movable structure, the flow control valve being fluidly connected in series between a source of fluid under pressure and the actuator, the servo control system having a plurality of fluid amplifiers responsive to the position command signal to produce respective fluid output signals, means normally supplying fluid flow to each fluid amplifier and, alternatively, shutting off fluid flow to any fluid amplifier whose output signal falls outside a predetermined range, and means summing the fluid amplifier output signals and operatively transmitting a resultant signal to the flow control valve, a fail-safe valving system fluidly connected in series between the flow control valve and the actuator and comprising:

a housing defining at least one chamber;

a valving structure slideably seated within the at least one chamber and movable through a range of positions which include first, second, and third sequential positions, the valving structure having valving means preventing fluid flow between the flow control valve and the actuator upon the valving member being in its third position, having porting means permitting substantially unrestricted fluid flow between the flow control valve and the actuator upon the valving member being in its first position, and having orificial means permitting restricted fluid flow between the flow control valve and the actuator upon the valving member being in its second position;

means urging the valving member toward its third position;

means, having fluid communication with each fluid amplifier, for urging the valving member toward, and constraining the valving member in, its first position upon any of the fluid amplifiers receiving fluid under pressure from the means normally supplying fluid flow to each fluid amplifier, and for releasing the valving member from constraint upon the fluid supply to all the fluid amplifiers being shut off, whereby the valving member is moved from its first position by the means urging the valving member toward its third position; and means normally preventing movement of the valving member from its second to its third position and, alternatively, permitting movement of the valving member to its third position upon the occurrence of a loss of fluid pressure upstream of the flow control valve.

17. For a fluid powered system of a type having first and second portions, each normally receiving a supply of fluid under pressure, and a third portion fluidly connected to the second portion, a fail-safe valving system fluidly connected in series between the second and third fluid system portions and comprising:
  a housing defining at least one chamber;
  a valving structure, comprising at least one valving member, slideably seated within the at least one chamber and movable therein through a range of positions which include first, second, and third sequential positions;
  means restricting any fluid flow between the second and third portions of the fluid powered system upon the occurrence of a loss of supply flow to the first portion of the fluid powered system and comprising orificial means, formed in the at least one valving member, for permitting restricted fluid flow upon the valving structure being in its second position;
  means preventing fluid flow between the second and third portions of the fluid powered system upon the occurrence of a loss of supply flow to the second portion of the fluid powered system, the means preventing fluid flow comprising valving means, defined by the valving structure, for preventing fluid flow upon the valving structure being in its third position.

18. The apparatus of claim 17, the fluid powered system third portion comprising an actuator, the actuator being drivingly connected to a movable load structure, the fluid powered system second portion comprising means fluidly operatively connected to the actuator, the apparatus further comprising:
  a position feedback system connected between the movable load structure and the means fluidly operatively connected to the actuator and comprising means for actuating the means fluidly operatively connected to the actuator to operate the actuator to move the load structure to a preselected position upon the fail-safe valving system being operative to restrict any fluid flow between the second and third portions of the fluid powered system.

19. The apparatus of claim 18, the position feedback system comprising means generating an error signal indicative of the deviation of the movable load structure from the preselected position.

20. The apparatus of claim 18, the means fluidly operatively connected to the actuator comprising a flow control valve having a movable valve element, the position feedback system being operatively connected to the movable valve element.

21. The apparatus of claim 19, the means fluidly operatively connected to the actuator comprising a flow control valve having a movable valve element, the position feedback system comprising means operatively connected to the movable valve element.

22. The apparatus of claim 21, the position feedback system comprising a linkage system connected between the movable load structure and the movable valve element of the flow control valve, the linkage system including actuating means preventing operation of the linkage system to move the valve element of the flow control valve when the fail-safe safe valving system is operative to permit substantially unrestricted fluid flow between the second and third portions of the fluid powered system, and alternatively, operatively engaging the linkage system with the valve element of the flow control valve upon the fail-safe valving system being operative to restrict fluid flow between the second and third portions of the fluid powered system.

23. The apparatus of claim 22, the actuating means including an idler crank rotatably connected, upon a first pivot axis, to a crank member operatively connected to the movable valve element of the flow control valve and having a cam follower mounted on the idler crank at a location spaced from the first pivot axis, a cam member being provided rotatably mounted on the housing, further comprising means operative for bringing the cam member into engagement with the cam follower upon the fail-safe valving system being operative to restrict fluid flow between the second and third portions of the fluid powered system, the cam member and cam follower, when in their mutually engaged mode, comprising means preventing rotation of the idler crank about its first pivot axis and permitting rotation of the idler crank about a second pivot axis through the cam follower whereby the rotation of the idler crank is operable to translate the crank member and the valve element of the flow control valve.

24. The apparatus of claim 23, the means operative for bringing the cam member into engagement with the cam follower comprising a toggle linkage system operatively connected to the cam member and having resilient means urging the cam member into engagment with the cam follower upon the fail-safe valving system being operative to restrict fluid flow between the second and third portions of the fluid powered system.

* * * * *